United States Patent
Hyodo

(10) Patent No.: US 10,662,617 B2
(45) Date of Patent: May 26, 2020

(54) WORK MACHINE

(71) Applicant: Hitachi Construction Machinery Co., Ltd., Tokyo (JP)

(72) Inventor: Koji Hyodo, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 274 days.

(21) Appl. No.: 15/756,266

(22) PCT Filed: Dec. 14, 2016

(86) PCT No.: PCT/JP2016/087188
§ 371 (c)(1),
(2) Date: Feb. 28, 2018

(87) PCT Pub. No.: WO2017/110611
PCT Pub. Date: Jun. 29, 2017

(65) Prior Publication Data
US 2018/0251957 A1 Sep. 6, 2018

(30) Foreign Application Priority Data
Dec. 25, 2015 (JP) ................. 2015-255266

(51) Int. Cl.
*E02F 9/22* (2006.01)
*F02B 37/12* (2006.01)
(Continued)

(52) U.S. Cl.
CPC .............. *E02F 9/22* (2013.01); *E02F 9/2066* (2013.01); *E02F 9/226* (2013.01); *E02F 9/2235* (2013.01);
(Continued)

(58) Field of Classification Search
CPC . E02F 9/22; E02F 9/226; E02F 9/2066; E02F 9/2235; F02D 23/00; F02D 41/0007;
(Continued)

(56) References Cited

U.S. PATENT DOCUMENTS 4,904,161 A 2/1990 Kamide et al.

FOREIGN PATENT DOCUMENTS

| CN | 101346549 A | 1/2009 |
| CN | 104420496 A | 3/2015 |

(Continued)

OTHER PUBLICATIONS

International Search Report of PCT/JP2016/087188 dated Mar. 7, 2017.

*Primary Examiner* — Jacob M Amick
*Assistant Examiner* — Charles Brauch
(74) *Attorney, Agent, or Firm* — Mattingly & Malur, PC

(57) ABSTRACT

To reduce increase of the temperature of a control device of a supercharger and increase the lifetime of the control device of the supercharger, a work machine includes a variable geometry supercharger having changeable supercharge pressure and a working device. The work machine includes a variable displacement work hydraulic pump configured to be driven by an engine and supply pressure oil to an actuator configured to drive the working device; a supercharger control device configured to control the supercharger; a temperature detection device configured to detect the temperature of the supercharger control device; and a main control device configured to restrict, in case the temperature of the supercharger control device is higher than a first temperature, a maximum absorbing torque of the work hydraulic pump as compared to case the temperature of the supercharger control device is lower than the first temperature.

8 Claims, 11 Drawing Sheets

(51) Int. Cl.

| | |
|---|---|
| *F02D 29/04* | (2006.01) |
| *F02D 23/00* | (2006.01) |
| *F01P 7/04* | (2006.01) |
| *F01P 7/16* | (2006.01) |
| *E02F 9/20* | (2006.01) |
| *F02D 41/00* | (2006.01) |
| *F01P 5/04* | (2006.01) |
| *F02B 37/24* | (2006.01) |
| *F02B 39/16* | (2006.01) |

(52) U.S. Cl.
CPC ............... *F01P 5/04* (2013.01); *F01P 7/044* (2013.01); *F01P 7/16* (2013.01); *F02B 37/12* (2013.01); *F02D 23/00* (2013.01); *F02D 29/04* (2013.01); *F02D 41/0007* (2013.01); *F01P 2060/02* (2013.01); *F01P 2060/16* (2013.01); *F02B 37/24* (2013.01); *F02B 2039/164* (2013.01); *F02D 2200/021* (2013.01); *Y02T 10/144* (2013.01)

(58) Field of Classification Search
CPC .... F02D 29/04; F02D 2200/021; F01P 7/044; F01P 7/16; F01P 5/04; F01P 2060/16; F01P 2060/02; F02B 37/12; F02B 37/24; F02B 2039/164; Y02T 10/144
See application file for complete search history.

(56) References Cited

FOREIGN PATENT DOCUMENTS

| | | |
|---|---|---|
| JP | 62-114152 U | 7/1987 |
| JP | 06-346748 A | 12/1994 |
| JP | 2002-188177 A | 7/2002 |
| JP | 2005-188674 A | 7/2005 |
| JP | 2007-270820 A | 10/2007 |
| JP | 2008-075629 A | 4/2008 |
| JP | 2008-110296 A | 5/2008 |
| JP | 2009-150216 A | 7/2009 |
| JP | 2010-101264 A | 5/2010 |
| JP | 2011-001896 A | 1/2011 |
| JP | 4729446 B2 * | 7/2011 |
| JP | 2013-132920 A | 7/2013 |
| JP | 2013-213416 A | 10/2013 |
| WO | 2013/146392 A1 | 10/2013 |

* cited by examiner

WORK MACHINE

TECHNICAL FIELD

The present invention relates to a work machine.

BACKGROUND ART

A known work machine includes a control unit configured to determine, in case a travel load measured by a travel load measurement unit is equal to or larger than a predetermined threshold, that the travel load is high and reduce the absorbing torque of a variable displacement hydraulic pump (refer to Patent Literature 1).

CITATION LIST

Patent Literature

Patent Literature 1: Japanese Patent Laid-open No. 2009-150216

SUMMARY OF INVENTION

Technical Problem

To fulfill requirements of exhaust gas regulation, studies have been made on such a configuration that a work machine includes a variable geometry turbo (VGT) capable of efficiently performing supercharge at slow rotation at which the energy of exhaust gas from an engine is low. However, recent downsizing of the engine has led to increase of a load on a supercharger, and thus influence of heat on a control device configured to control the supercharger is concerned. The control device of the supercharger potentially fails in case the temperature of the control device is high. Patent Literature 1 provides no description of a supercharger, a control device configured to control the supercharger, and influence of heat on the control device.

Solution to Problem

A work machine according to an aspect of the present invention includes a variable geometry supercharger having changeable supercharge pressure and a working device. The work machine includes: a variable displacement work hydraulic pump configured to be driven by an engine and supply pressure oil to an actuator configured to drive the working device; a supercharger control device configured to control the supercharger; a temperature detection device configured to detect the temperature of the supercharger control device; and a main control device configured to restrict, in case the temperature of the supercharger control device is higher than a first temperature, a maximum absorbing torque of the work hydraulic pump as compared to case the temperature of the supercharger control device is lower than the first temperature.

Advantageous Effects of Invention

The present invention can reduce increase of the temperature of a control device of a supercharger and increase the lifetime of the control device of the supercharger.

DESCRIPTION OF EMBODIMENTS

Embodiments of a work machine according to the present invention will be described below with reference to the accompanying drawings.

First Embodiment

Figure 1:
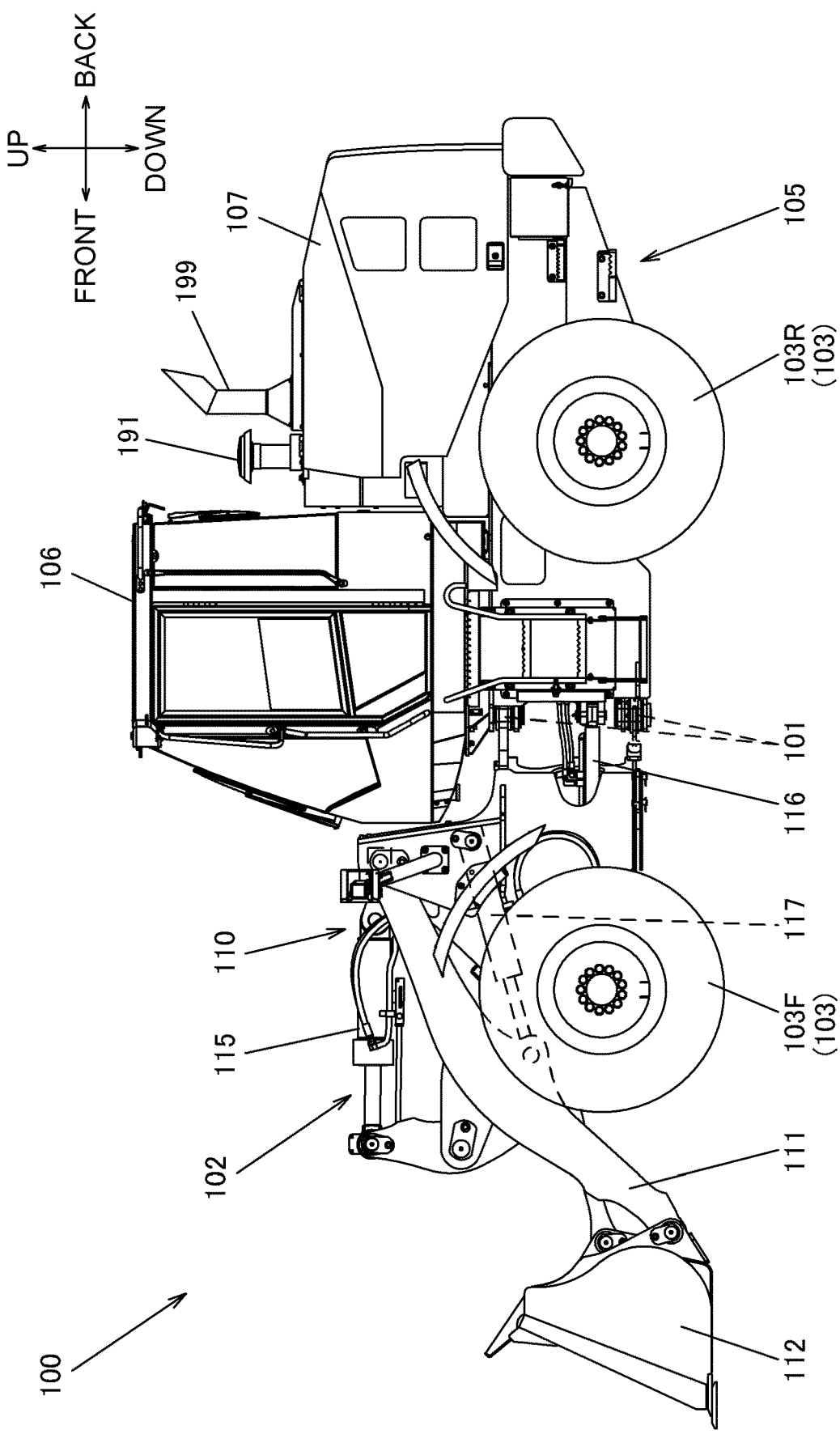
FIG. 1 is a side view of a wheel loader.

FIG. 1 is a side view of a wheel loader 100 as an exemplary work machine according to a first embodiment of the present invention. The wheel loader 100 includes an arm 111, a bucket 112, a front vehicle body 110 including a front wheel 103F, a cab 106, a machine room 107, and a rear vehicle body 105 including a rear wheel 103R. An engine is disposed in the machine room 107.

The arm 111 is rotated (elevated) in an up-down direction by drive of an arm cylinder 117, and the bucket 112 rotates (crowds or dumps) in the up-down direction by drive of a bucket cylinder 115. The arm 111, the arm cylinder 117, the bucket 112, and the bucket cylinder 115 serve as a front working device 102. The front vehicle body 110 and the rear vehicle body 105 are rotatably coupled with each other through a center pin 101. The front vehicle body 110 bends to right and left relative to the rear vehicle body 105 through expansion and contraction of a steering cylinder 116.

Figure 2:
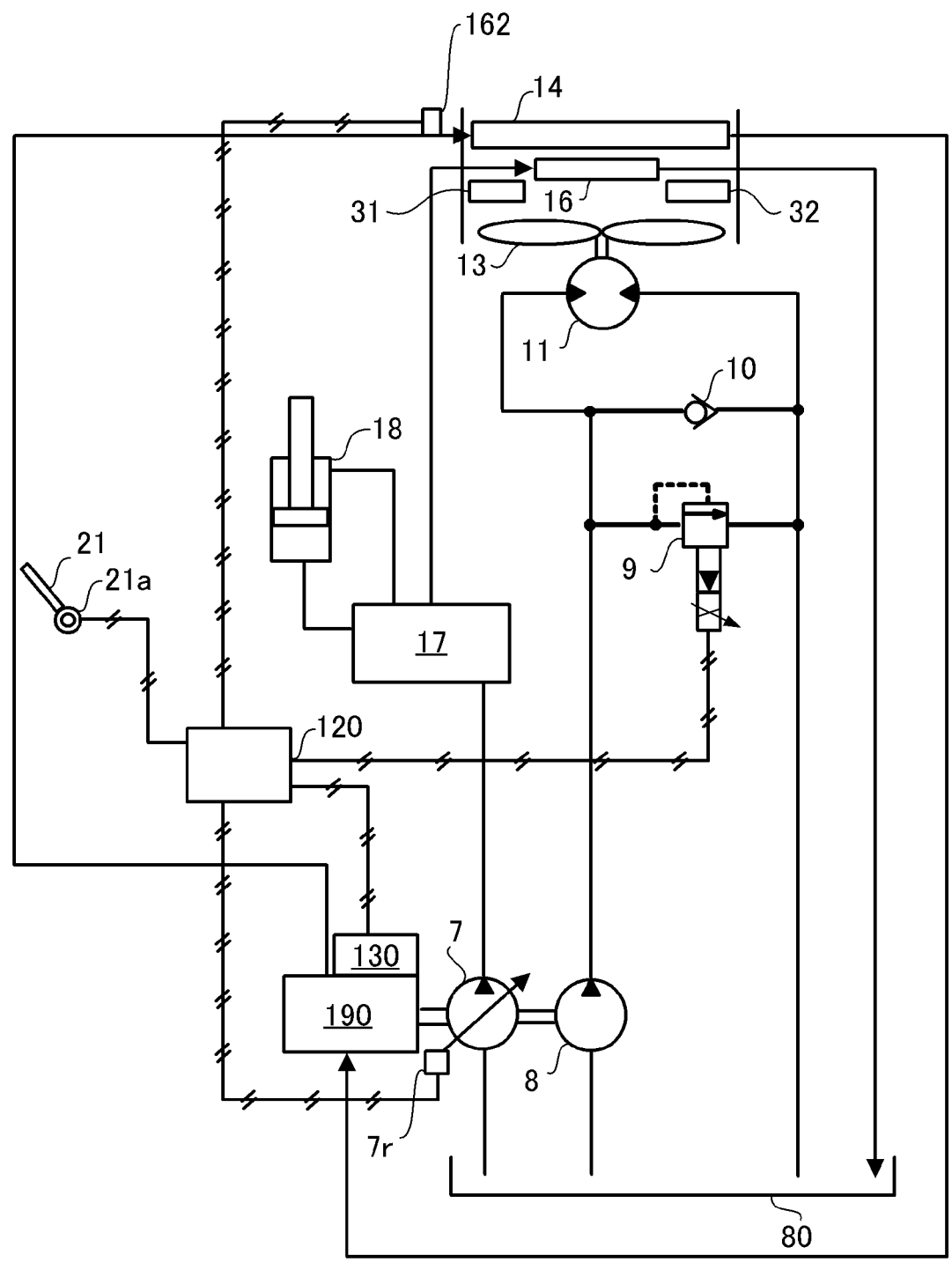
FIG. 2 is a diagram illustrating a schematic configuration of the wheel loader.

FIG. 2 is a diagram illustrating a schematic configuration of the wheel loader 100. The cab 106 of the wheel loader 100 includes an acceleration pedal 21. The rotational speed of an engine 190 increases as a pedal operation amount (step-in amount) of the acceleration pedal 21 increases. As the engine rotational speed increases, the rotational speeds of a hydraulic pump (hereinafter referred to as a work pump 7) for working device drive to be described later and a hydraulic pump (referred to as a fan pump 8) for cooling fan drive increase, and the flow rate of hydraulic oil discharged from each hydraulic pump increases.

The wheel loader 100 includes the work pump 7 configured to be driven by the engine 190, a control valve 17 configured to control pressure oil discharged from the work pump 7, and a work hydraulic pressure cylinder 18 (for example, a hydraulic pressure actuator such as the bucket cylinder 115 or the arm cylinder 117). The control valve 17 is driven through an operation of an operation lever (not illustrated), and the work hydraulic pressure cylinder 18 is driven in accordance with the operation amount of the operation lever. Accordingly, pressure oil discharged from the work pump 7 is supplied to the work hydraulic pressure cylinder 18, and the front working device 102 is driven.

The work pump 7 is a tilted-plate or tilted-shaft variable displacement hydraulic pump, the displacement volume of which can be changed. The discharge flow rate of the work pump 7 is determined in accordance with the displacement volume and the rotational speed of the work pump 7. A regulator 7r adjusts the displacement volume so that the absorbing torque of the work pump 7 does not exceed a maximum absorbing torque (maximum pump input torque) set by a main controller 120. As described later, a set value of the maximum absorbing torque is changed in accordance with the temperature of a turbo controller 140.

The wheel loader 100 further includes the fan pump 8 configured to be driven by the engine 190, a fan hydraulic motor (hereinafter referred to as a fan motor 11) configured to be driven by pressure oil discharged from the fan pump 8, a cooling fan 13 rotated by the fan motor 11, a relief valve 9 for setting a highest rotational speed of the fan motor 11, and a check value 10 for preventing cavitation in case a hydraulic pressure circuit for driving the fan motor 11 has negative pressure due to change in the rotational speed of the engine 190. The fan motor 11 rotates the cooling fan 13 configured to send external air (cooling wind) to a heat exchanger unit including a plurality of heat exchangers. The heat exchanger unit includes, as the heat exchangers, a radiator 14, a hydraulic oil cooler 16, an intercooler 31, and an EGR cooler 32.

Cooling water of the engine 190 flows into the radiator 14 through a thermostat (not illustrated) to be cooled at the radiator 14 and then returns to the engine 190 again. The cooling water of the engine 190 is also guided to a casing of a control substrate included in the turbo controller 140 to be described later, and cools the turbo controller 140 while passing through a cooling water path provided to the casing. Hydraulic oil is pumped and discharged from a tank 80 by the work pump 7 and flows into the hydraulic oil cooler 16 through the control valve 17 to be cooled at the hydraulic oil cooler 16, and then returns to the tank 80 again.

In case pressure oil discharged from the fan pump 8 (hydraulic oil) is supplied to the fan motor 11, the fan motor 11 rotates, and the cooling fan 13 coupled with the rotational axis of the fan motor 11 rotates. The oil supplied to the fan motor 11 returns to the tank 80. In case the cooling fan 13 rotates, cooling wind is generated by the cooling fan 13. The cooling wind generated by the cooling fan 13 is sent toward the radiator 14, the hydraulic oil cooler 16, the intercooler 31, and the EGR cooler 32. Accordingly, the cooling water of the engine 190, the hydraulic oil, air supercharged by a supercharger 50 to be described later, and EGR gas are cooled through heat exchange with the cooling wind.

The relief valve 9 is interposed between a discharge side pipe line from the fan pump 8 and a returning side pipe line to the tank 80. The relief valve 9 restricts discharge side pressure (hereinafter referred to as discharge pressure Pp) of the fan pump 8, which is input side pressure (motor drive pressure) of the fan motor 11.

The relief valve 9 is an electromagnetic variable relief valve having a variable set pressure, and sets a highest pressure of pressure oil (hydraulic oil) supplied from the fan pump 8 to the fan motor 11 in accordance with control current from the main controller 120. As described later, the main controller 120, controls a set pressure Ps (hereinafter also referred to as a relief pressure) of the relief valve 9 by changing a control current value supplied to the relief valve 9 based on a substrate temperature Tt of the control substrate included in the turbo controller 140.

Figure 3A:
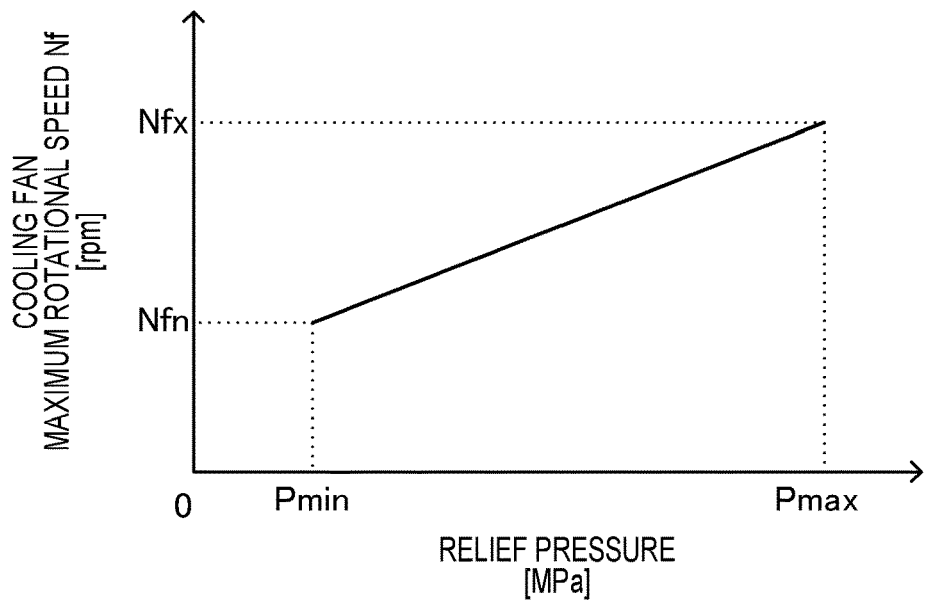
FIG. 3A is a diagram illustrating a relation between a set pressure (relief pressure) of a relief valve and a highest rotational speed of a cooling fan.

The main controller 120 sets a highest rotational speed Nf of the cooling fan 13 by changing the set pressure (relief pressure) Ps of the relief valve 9 to control the discharge pressure Pp. FIG. 3A is a diagram illustrating a relation between the set pressure (relief pressure) Ps of the relief valve 9 and the highest rotational speed Nf of the cooling fan 13. As illustrated in FIG. 3A, the highest rotational speed Nf of the cooling fan 13 has a lower limit value Nfn in case the set pressure Ps of the relief valve 9 is a lowest pressure Pmin, and then the highest rotational speed Nf of the cooling fan 13 increases as the set pressure Ps of the relief valve 9 increases. The highest rotational speed Nf of the cooling fan 13 has an upper limit value Nfx in case the set pressure Ps of the relief valve 9 is a highest pressure Pmax.

Figure 4A:
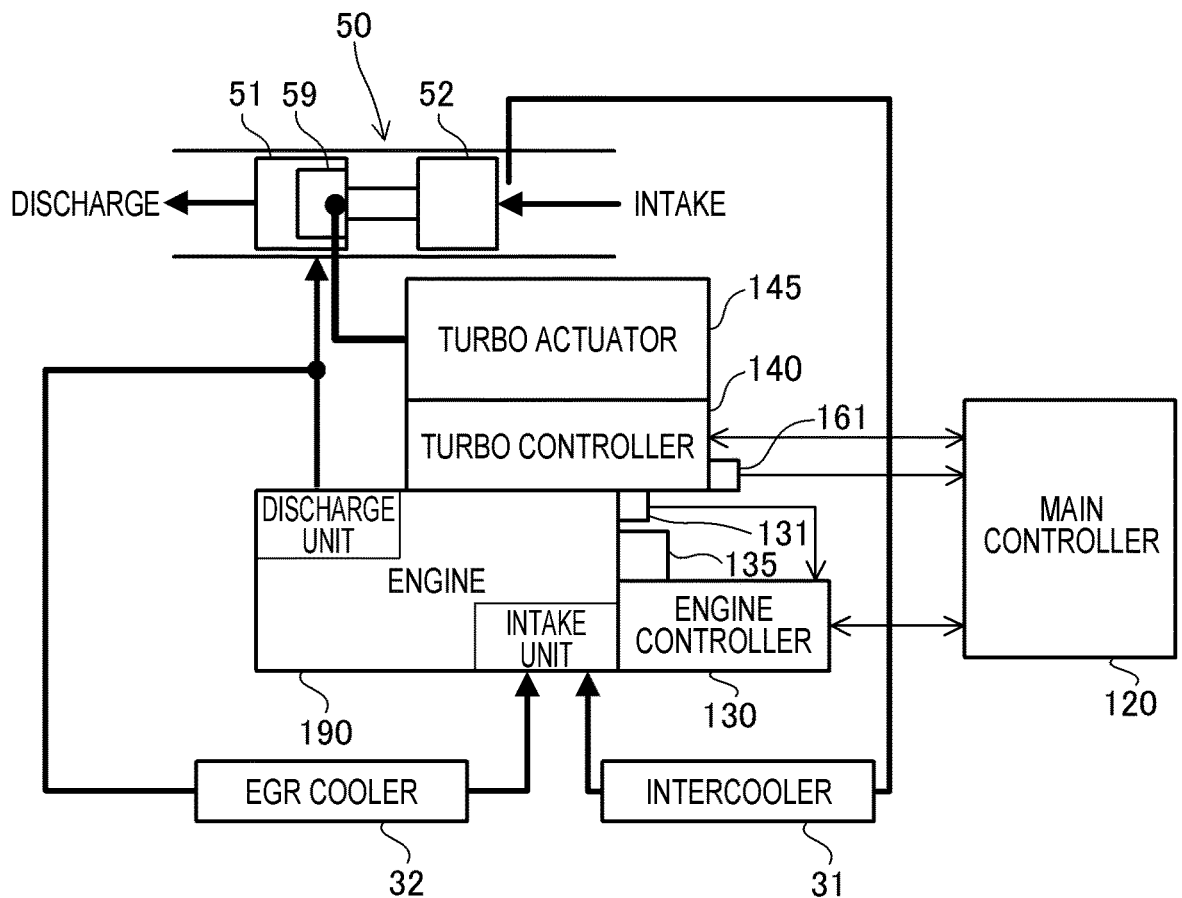
FIG. 4A is a diagram illustrating the configuration of a control system of an engine.

FIG. 4A is a diagram illustrating the configuration of a control system of the engine 190. As illustrated in FIG. 4A, the engine 190 is connected with a discharge pipe through which exhaust gas discharged from the engine 190 passes and an intake pipe through which intake air supplied to the engine 190 passes. The engine 190 is connected with an EGR pipe that is bifurcated from a discharge path and guides part (hereinafter referred to as exhaust gas recirculation (EGR) gas) of exhaust gas to an intake system (downstream side of a compressor 52).

An engine system of the wheel loader 100 according to the present embodiment includes a supercharger (turbocharger) 50 configured to perform supercharge. The supercharger 50 includes a turbine 51 disposed in the discharge pipe, and the compressor 52 disposed in the intake pipe. The turbine 51 and the compressor 52 are mechanically coupled with each other. The turbine 51 includes a plurality of turbine vanes radially provided to a rotational axis, and is rotated with the energy of exhaust gas discharged from a discharge unit of the engine 190. The compressor 52 includes a plurality of compressor impellers radially provided to a rotational axis, and is rotated by the turbine 51 to compress air taken in from the outside and supply the compressed air to an intake unit (engine cylinder) of the engine 190, in other words, supercharge the air.

The turbine 51 is provided with, as an opening area adjustment mechanism, a nozzle vane mechanism 59 including a plurality of nozzle vanes each having an entrance through which exhaust gas is guided to the turbine vanes and the area of which is changeable. The degree of opening of the nozzle vanes is adjusted by a turbo actuator 145. The turbo actuator 145 is driven by a control signal generated by the turbo controller 140 based on the operation state of the engine 190. In other words, the supercharger 50 according to the present embodiment is configured as a variable geometry turbocharger having a supercharge pressure that is changeable by adjusting the degree of opening of the nozzle vanes to change the flow speed of gas flowing into the turbine 51.

In case the degree of opening of the nozzle vanes is changed, the rotational speed of the supercharger 50 is adjusted so that supercharge pressure and discharge gas pressure are achieved in accordance with the operation state of the engine 190. The supercharge pressure and the discharge gas pressure of the engine can be controlled to increase an EGR rate, thereby reducing generation of nitrogen oxide at combustion. At low rotation of the engine 190, the turbo controller 140 reduces the degree of opening of the nozzle vanes to increase the flow speed of gas flowing into the turbine vanes and increase the rotational speed of the supercharger 50, thereby improving transient response performance of the engine 190.

Air taken in through an inlet 191 (refer to FIG. 1) is supplied to the supercharger 50 through an air cleaner (not illustrated) and supercharged. The air supercharged at the supercharger 50 is sent to the intercooler 31 to be cooled at the intercooler 31, and then supplied to the intake unit of the engine 190. Exhaust gas discharged from the discharge unit of the engine 190 passes through the supercharger 50, and then is sent to a discharge device (not illustrated) to be cleaned at the discharge device before being discharged into atmosphere through a tail pipe 199 (refer to FIG. 1) after noise thereof is reduced. EGR gas is sent to the EGR cooler 32 to be cooled at the EGR cooler 32, and then supplied (recirculated) to the intake unit of the engine 190.

In the engine 190, a fuel injection amount is controlled by a fuel injection device (governor) 135. The fuel injection device is controlled by a control signal output from an engine controller 130.

The main controller 120, the engine controller 130, and the turbo controller 140 each include a control substrate on which an arithmetic processing device including a CPU, a storage device such as a ROM or a RAM, and any other peripheral circuit are mounted.

As illustrated in FIGS. 2 and 4A, the main controller 120 is connected with various sensors such as an acceleration operation amount detector 21a (refer to FIG. 2), a substrate temperature sensor 161 (refer to FIG. 4A), and a cooling water temperature sensor 162 (refer to FIG. 2). The main controller 120 is also connected with the engine controller 130 and the turbo controller 140 so that various kinds of information is communicated among the controllers.

As illustrated in FIG. 2, the acceleration operation amount detector 21a detects a pedal operation amount (a pedal stroke or a pedal angle) of the acceleration pedal 21, and outputs the detected information to the main controller 120. The main controller 120 sets a target engine rotational speed of the engine 190 in accordance with the pedal operation amount of the acceleration pedal 21 detected by the acceleration operation amount detector 21a. As illustrated in FIG. 4A, the main controller 120 outputs a control signal corresponding to the set target engine rotational speed to the engine controller 130. The engine controller 130 is connected with a rotational speed sensor 131 configured to detect the actual engine rotational speed of the engine 190. The engine controller 130 compares the actual engine rotational speed of the engine 190 detected by the rotational speed sensor 131 and the target engine rotational speed from the main controller 120, and controls the fuel injection device (governor) 135 so that the actual engine rotational speed of the engine 190 becomes closer to the target engine rotational speed.

As illustrated in FIG. 2, the cooling water temperature sensor 162 detects the temperature (hereinafter referred to as a cooling water temperature) of the cooling water of the engine 190, and outputs the detected information to the main controller 120. As illustrated in FIG. 4A, the substrate temperature sensor 161 is mounted on the control substrate included in the turbo controller 140, detects the temperature (hereinafter referred to as the substrate temperature Tt) of the control substrate, and outputs the detected information to the main controller 120.

Figure 4B:
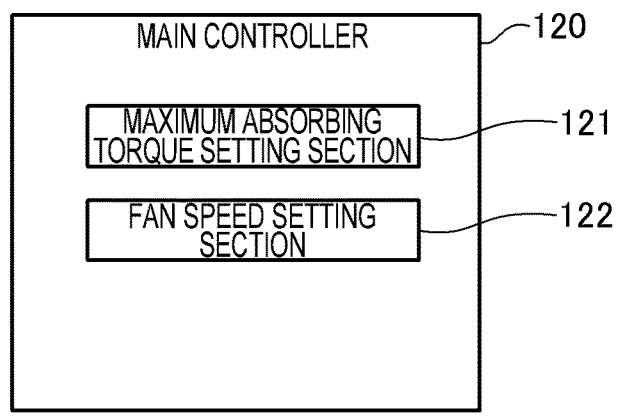
FIG. 4B is a functional block diagram of a main controller.

FIG. 4B is a functional block diagram of the main controller 120. As illustrated in FIG. 4B, the main controller 120 functionally includes a maximum absorbing torque setting section 121 and a fan speed setting section 122.

Figure 5:
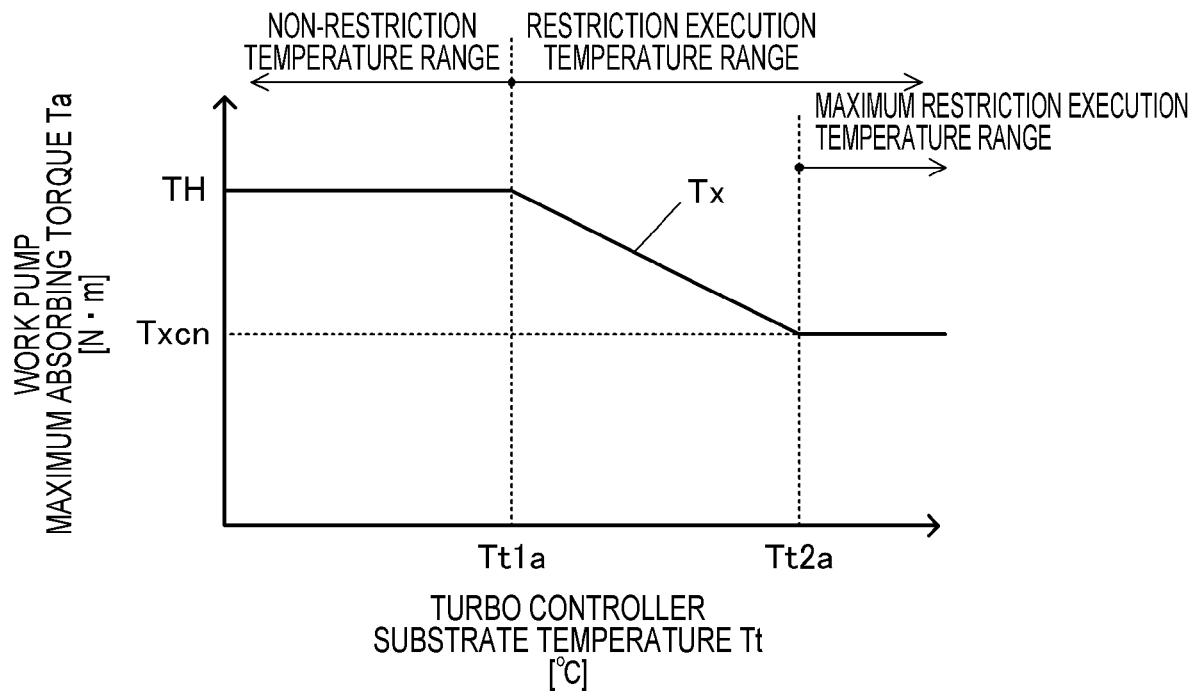
FIG. 5 is a diagram illustrating a relation between the substrate temperature of the turbo controller and a maximum absorbing torque of a work pump.

FIG. 5 is a diagram illustrating a relation between the substrate temperature Tt of the turbo controller 140 and a maximum absorbing torque Ta of the work pump 7. The storage device of the main controller 120 stores a table Tx indicating a characteristic of the maximum absorbing torque Ta of the work pump 7 for the substrate temperature Tt of the turbo controller 140 illustrated in FIG. 5. The maximum absorbing torque setting section 121 (refer to FIG. 4B) sets, by referring to the table Tx, the maximum absorbing torque Ta of the work pump 7 based on the substrate temperature Tt detected by the substrate temperature sensor 161.

In case the substrate temperature Tt is equal to or lower than a first restriction threshold Tt1$a$, the maximum absorbing torque Ta is set to be an upper limit value TH. In case the substrate temperature Tt is higher than the first restriction threshold Tt1$a$, the maximum absorbing torque Ta is lower than the upper limit value TH. In other words, in case the substrate temperature Tt exceeds the first restriction threshold Tt1$a$, the maximum absorbing torque Ta of the work pump 7 is restricted. In case the substrate temperature Tt is higher than the first restriction threshold Tt1$a$, the maximum absorbing torque Ta gradually decreases as the substrate temperature Tt increases. In case the substrate temperature Tt is higher than a second restriction threshold Tt2$a$, the maximum absorbing torque Ta of the work pump 7 has a lower limit value Txcn. In other words, a restriction amount $\Delta T$ (=TH−Txcn) of the maximum absorbing torque Ta of the work pump 7 changes between the upper limit value TH and the lower limit value Txcn.

The first restriction threshold Tt1$a$ corresponds to the upper limit value of a temperature range (hereinafter referred to as a non-restriction temperature range) in which the maximum absorbing torque Ta of the work pump 7 is not restricted, in other words, the lower limit value of a temperature range (hereinafter referred to as a restriction execution temperature range) in which the maximum absorbing torque Ta of the work pump 7 is restricted. The first restriction threshold Tt1$a$ is, for example, 110° C. approximately. The second restriction threshold Tt2$a$ corresponds to the lower limit value of temperature range (hereinafter referred to as a maximum restriction execution temperature range) in which the maximum absorbing torque Ta of the work pump 7 is set to be the lower limit value Txcn. The second restriction threshold Tt2$a$ is, for example, 125° C. approximately, which is higher than the first restriction threshold Tt1$a$.

The main controller 120 calculates, by referring to the table Tx, the maximum absorbing torque Ta based on the substrate temperature Tt of the control substrate included in the turbo controller 140, which is detected by the substrate temperature sensor 161, and controls the displacement volume of the work pump 7 so that the maximum absorbing torque Ta is not exceeded based on a discharge pressure (load pressure) of the work pump 7 detected by a sensor (not illustrated) and the actual rotational speed of the engine 190.

Figure 3B:
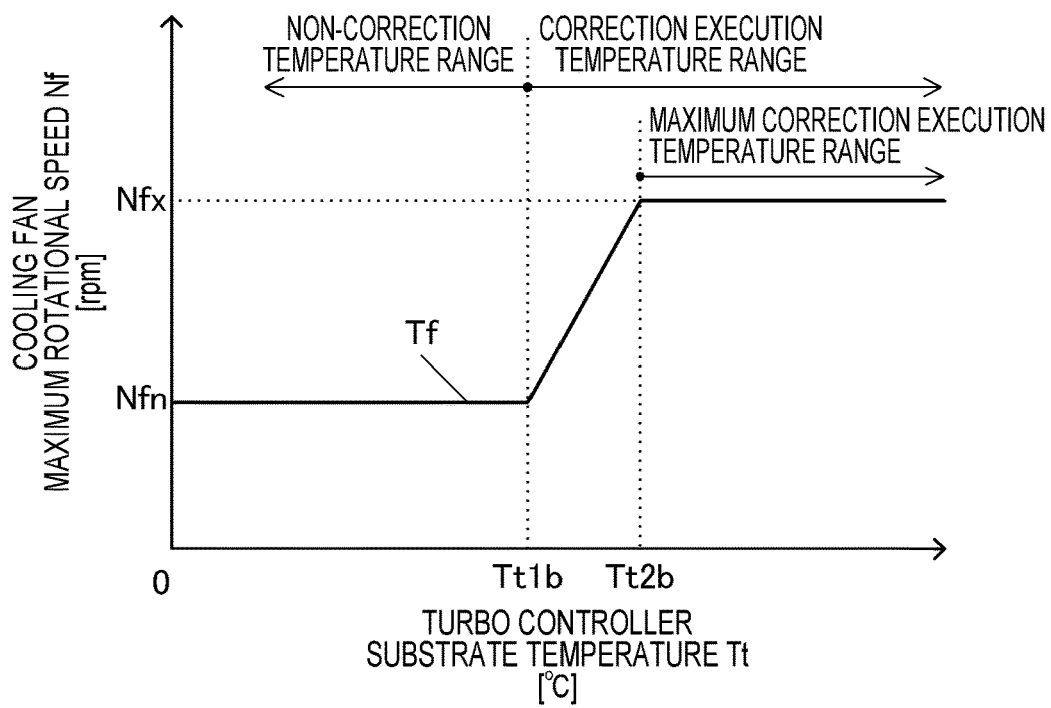
FIG. 3B is a diagram illustrating a relation between a substrate temperature of a turbo controller and the highest rotational speed of the cooling fan.

FIG. 3B is a diagram illustrating a relation between the substrate temperature Tt of the turbo controller 140 and the highest rotational speed Nf of the cooling fan 13. The storage device of the main controller 120 stores a table Tf indicating a characteristic of the highest rotational speed Nf of the cooling fan 13 for the substrate temperature Tt of the turbo controller 140 illustrated in FIG. 3B. The fan speed setting section 122 (refer to FIG. 4B) sets, by referring to the table Tf, the highest rotational speed Nf of the cooling fan 13 based on the substrate temperature Tt detected by the substrate temperature sensor 161.

In case the substrate temperature Tt is equal to or lower than a first correction threshold Tt1$b$, the highest rotational speed Nf is set to be the lower limit value Nfn. In case the substrate temperature Tt is higher than the first correction threshold Tt1$b$, the highest rotational speed Nf is higher than the lower limit value Nfn. In other words, speed increase correction is performed on the highest rotational speed Nf of the cooling fan 13 in case the substrate temperature Tt exceeds the first correction threshold Tt1$b$. In case the substrate temperature Tt is higher than the first correction threshold Tt1$b$, the highest rotational speed Nf gradually increases as the substrate temperature Tt increases. In case the substrate temperature Tt is higher than a second correction threshold Tt2$b$, the highest rotational speed Nf of the cooling fan 13 has the upper limit value Nfx. In other words, a correction amount ΔN (=Nfx−Nfn) of the highest rotational speed Nf of the cooling fan 13 changes between the lower limit value Nfn and the upper limit value Nfx.

The first correction threshold Tt1$b$ illustrated in FIG. 3B is equal to the first restriction threshold Tt1$a$ illustrated in FIG. 5 (Tt1$b$=Tt1$a$). The first correction threshold Tt1$b$ corresponds to the upper limit value of a temperature range (hereinafter referred to as a non-correction temperature range) in which speed increase correction is not performed on the highest rotational speed Nf of the cooling fan 13, in other words, the lower limit value of a temperature range (hereinafter referred to as a correction execution temperature range) in which the speed increase correction is performed on the highest rotational speed Nf of the cooling fan 13. The second correction threshold Tt2$b$ illustrated in FIG. 3B is equal to the second restriction threshold Tt2$a$ illustrated in FIG. 5 (Tt2$b$=Tt2$a$). The second correction threshold Tt2$b$ corresponds to the lower limit value of a temperature range (hereinafter referred to as a maximum correction execution temperature range) in which the highest rotational speed Nf of the cooling fan 13 is set to be the upper limit value Nfx.

The main controller 120 calculates, by referring to the table Tf, the highest rotational speed Nf of the cooling fan 13 based on the substrate temperature Tt of the control substrate included in the turbo controller 140, which is detected by the substrate temperature sensor 161. The main controller 120 then controls the set pressure Ps by outputting control current to the relief valve 9 so that the highest rotational speed Nf of the cooling fan 13 becomes equal to the calculated value.

The detection of the substrate temperature Tt of the turbo controller 140, the calculation processing of the maximum absorbing torque Ta of the work pump 7 based on the substrate temperature Tt, and the calculation processing of the highest rotational speed Nf of the cooling fan 13 are repeatedly executed in a predetermined control period by the main controller 120 in case an ignition switch (not illustrated) is turned on.

The operation according to the first embodiment is summarized as follows. In case the substrate temperature Tt is equal to or lower than the first restriction threshold Tt1$a$ (=the first correction threshold Tt1$b$), the maximum absorbing torque Ta of the work pump 7 is not restricted (refer to FIG. 5), and speed increase correction is not performed on the highest rotational speed Nf of the cooling fan 13 (refer to FIG. 3B).

In case high load work (for example, V-shape loading) is repeatedly performed for a long time, the temperature of the supercharger 50, or the temperatures of the turbine 51 and the compressor 52 increase. Heat generated at, for example, the turbine 51 or the compressor 52 is transferred to the control substrate included in the turbo controller 140 through a casing of the turbine 51 or the compressor 52 and the turbo actuator 145. In case the substrate temperature Tt of the control substrate included in the turbo controller 140 exceeds the first restriction threshold Tt1$a$ (=the first correction threshold Tt1$b$), the maximum absorbing torque Ta of the work pump 7 is restricted (refer to FIG. 5) and speed increase correction is performed on the highest rotational speed Nf of the cooling fan 13 (refer to FIG. 3B). For example, in case the substrate temperature Tt is equal to or higher than the second restriction threshold Tt2$a$ (=the second correction threshold Tt2$b$), the maximum absorbing torque Ta of the work pump 7 is set to be the lower limit value Txcn, and the highest rotational speed Nf of the cooling fan 13 is set to be the upper limit value Nfx.

The V-shape loading is excavation and loading work performed in a cycle including operations (a) to (d) below.

(a) The wheel loader 100 travels forward toward a mound to plunge the bucket 112 into the mound, and the bucket 112 and the arm 111 are operated to perform excavation work.

(b) In case the excavation work ends, the wheel loader 100 is temporarily retracted.

(c) The wheel loader 100 travels forward toward a dump truck and stops in front of the dump truck to load dirt or the like inside the bucket 112 onto the dump truck.

(d) The wheel loader 100 is retracted to the original position.

According to the present embodiment, the maximum absorbing torque Ta of the work pump 7 is restricted to be low, which leads to a longer work cycle time. As a result, an engine load decreases, and the substrate temperature Tt of the control substrate included in the turbo controller 140 decreases accordingly. In addition, according to the present embodiment, speed increase correction is performed on the highest rotational speed Nf of the cooling fan 13, thereby effectively cooling the turbo controller 140.

In case the substrate temperature Tt is equal to or lower than the first restriction threshold Tt1$a$ (=the first correction threshold Tt1$b$), the maximum absorbing torque Ta of the work pump 7 is set to be the upper limit value TH, and the highest rotational speed Nf of the cooling fan 13 is set to be the lower limit value Nfn. In other words, in case the substrate temperature Tt is equal to or lower than the first restriction threshold Tt1$a$ (=the first correction threshold Tt1$b$), the main controller 120 cancels restriction of the maximum absorbing torque Ta of the work pump 7 and returns the state of the work pump 7 from a restriction state to a non-restriction state. In case the substrate temperature Tt is equal to or lower than the first restriction threshold Tt1$a$ (=the first correction threshold Tt1$b$), the main controller 120 cancels the speed increase correction of the highest rotational speed Nf of the cooling fan 13 and returns the state of the cooling fan 13 from a correction state to a non-the correction state.

The embodiment described above achieves effects as follows.

(1) The wheel loader 100 includes the variable geometry supercharger 50, the supercharge pressure of which is changeable by adjusting the opening area of the flow path of exhaust gas from the engine 190 to the turbine 51, and the front working device 102 configured to be driven by pressure oil discharged from the work pump 7. The work pump 7 is a variable displacement hydraulic pump configured to be driven by the engine 190 and supply pressure oil to the work hydraulic pressure cylinder 18 configured to drive the front working device 102. The turbo controller 140 controls the supercharger 50, and the substrate temperature Tt of the turbo controller 140 is detected by the substrate temperature sensor 161. The main controller 120 restricts the maximum absorbing torque Ta of the work pump 7 to be low in case the substrate temperature Tt is higher than the first restriction threshold Tt1a as compared to case the substrate temperature Tt is lower than the first restriction threshold Tt1a.

In case the maximum absorbing torque Ta of the work pump 7 is restricted, for example, the discharge amount of the work pump 7 in case the operation lever is operated to maximum is low as compared to case the restriction is not performed. Accordingly, the maximum operation speed of the work hydraulic pressure cylinder 18 is restricted, and the operation speed of the front working device 102 decreases. Thus, in case the front working device 102 performs a predetermined operation, the operation takes a longer operation time from start to end.

This leads to a longer work cycle time and a lower engine load, and accordingly, a heat load on the supercharger 50 decreases, and the substrate temperature Tt of the control substrate included in the turbo controller 140 decreases. Since the substrate temperature Tt of the control substrate included in the turbo controller 140 can be prevented from increasing, a longer lifetime of the turbo controller 40 can be achieved. As a result, the requirements of exhaust gas regulation can be fulfilled for a long time.

(2) It is strongly required to avoid interruption of work by the work machine. In case the temperature of the turbo controller 140 is higher than the second restriction threshold Tt2a and the maximum absorbing torque Ta of the work pump 7 is not restricted, the turbo controller 140 potentially fails and becomes unable to appropriately control the supercharge pressure. As a result, work by the wheel loader 100 is inevitably interrupted to perform repair. In the present embodiment, the work cycle time in the restriction state is long as compared to the non-restriction state, but work interruption can be avoided.

(3) The wheel loader 100 includes the radiator (heat exchanger) 14 configured to cool cooling water (refrigerant), the cooling fan 13 configured to generate cooling wind for the radiator 14, the fan pump 8 configured to be driven by the engine 190, and the fan motor 11 configured to be driven by pressure oil discharged from the fan pump 8 and rotate the cooling fan 13. The main controller 120 controls the rotational speed of the cooling fan 13 by adjusting the set pressure Ps of the relief valve 9 based on the substrate temperature Tt of the control substrate included in the turbo controller 140. In case the substrate temperature Tt of the turbo controller 140 is higher than the first correction threshold Tt1b, a fan control device including the main controller 120 and the relief valve 9 executes correction to increase the highest rotational speed of the cooling fan 13 as compared to case the substrate temperature Tt of the turbo controller 140 is lower than the first correction threshold Tt1b.

With this configuration, the rotational speed of the cooling fan 13 increases in case the highest rotational speed of the engine 190 is equal to a high idle rotational speed and the substrate temperature Tt of the turbo controller 140 is higher than the first correction threshold Tt1b, for example, at maximum stepping on the acceleration pedal 21. Thus, according to the present embodiment, in case the substrate temperature Tt of the turbo controller 140 becomes high, the cooling performance of the cooling fan 13 is increased so that the turbo controller 140 is effectively cooled in case the maximum absorbing torque Ta of the work pump 7 is restricted.

(4) After having restricted the maximum absorbing torque Ta of the work pump 7, the main controller 120 cancels the restriction in case the substrate temperature Tt of the control substrate included in the turbo controller 140 becomes equal to or lower than the first restriction threshold Tt1a. With this configuration, the work pump 7 automatically returns to the non-restriction state in case the temperature of the turbo controller 140 decreases, and thus work can be performed in a normal cycle time. Accordingly, improved operation efficiency is achieved.

(5) After having executed correction to increase the highest rotational speed Nf of the cooling fan 13, the main controller 120 cancels the speed increase correction in case the substrate temperature Tt of the control substrate included in the turbo controller 140 becomes equal to or lower than the first correction threshold Tt1b. With this configuration, the cooling fan 13 automatically returns to the non-correction state in case the temperature of the turbo controller 140 decreases, and thus the speed of the cooling fan 13 decreases. Accordingly, improved fuel consumption is achieved.

(6) The turbo controller 140 is cooled by cooling water of the engine 190. In case a load on the engine 190 is reduced by restriction control of the maximum absorbing torque of the work pump 7, the cooling water temperature decreases, and accordingly, the temperature of the turbo controller 140 can be effectively reduced as compared to case the turbo controller 140 is not cooled by cooling water. In case the cooling water of the engine 190 is used, neither dedicated refrigerant nor cooling mechanism for cooling the turbo controller 140 needs to be provided.

Modification 1 of First Embodiment

The first embodiment describes the example in which, in case the substrate temperature Tt of the turbo controller 140 exceeds the first restriction threshold Tt1a, the restriction amount ΔT of the maximum absorbing torque Ta of the work pump 7 gradually increases as the substrate temperature Tt increases. However, the present invention is not limited thereto.

For example, in case the substrate temperature Tt of the turbo controller 140 exceeds the first restriction threshold Tt1a, the maximum absorbing torque Ta of the work pump 7 may be discontinuously changed so that the maximum absorbing torque Ta becomes equal to the lower limit value Txcn stored in the storage device of the main controller 120 in advance. In this case, canceling the restriction in case the substrate temperature Tt becomes equal to or lower than the first restriction threshold Tt1a would potentially cause alternate repetition of the restriction state and the non-restriction state near the first restriction threshold Tt1$a$, which leads to choppy operation of the front working device 102. For this reason, it is preferable to set a cancellation condition temperature lower than the first restriction threshold Tt1$a$ in advance. In other words, it is preferable that the cancellation condition temperature is different from a restriction condition temperature to achieve hysteresis.

Modification 2 of First Embodiment

The first embodiment describes the example in which, in case the substrate temperature Tt of the turbo controller 140 exceeds the first correction threshold Tt1$b$, the correction amount ΔN of the highest rotational speed Nf of the cooling fan 13 gradually increases as the substrate temperature Tt increases. However, the present invention is not limited thereto.

For example, in case the substrate temperature Tt of the turbo controller 140 exceeds the first restriction threshold Tt1$a$, the highest rotational speed Nf of the cooling fan 13 may be discontinuously changed so that the highest rotational speed Nf becomes equal to the upper limit value Nfx stored in the storage device of the main controller 120 in advance. In this case, canceling the increase correction in case the substrate temperature Tt becomes equal to or lower than the first correction threshold Tt1$b$ would potentially cause alternate repetition of the restriction state and the non-restriction state near the first correction threshold Tt1$b$. For this reason, it is preferable to set a cancellation condition temperature lower than the first correction threshold Tt1$b$ in advance. In other words, it is preferable that the cancellation condition temperature is different from a restriction condition temperature to achieve hysteresis.

Modification 3 of First Embodiment

The first embodiment describes the example in which the first correction threshold Tt1$b$ illustrated in FIG. 3B is equal to the first restriction threshold Tt1$a$ illustrated in FIG. 5, and the second correction threshold Tt2$b$ illustrated in FIG. 3B is equal to the second restriction threshold Tt2$a$ illustrated in FIG. 5. However, the present invention is not limited thereto. For example, the first correction threshold Tt1$b$ illustrated in FIG. 3B may be set to be lower than the first restriction threshold Tt1$a$ illustrated in FIG. 5 (Tt1$b$<Tt1$a$). In this case, speed increase correction is performed on the highest rotational speed Nf of the cooling fan 13 before the operation speed of the front working device 102 is restricted. This achieves reduction of the frequency (time) of reducing increase of the temperature of the turbo controller 140 and restricting the operation speed of the front working device 102.

Second Embodiment

Figure 6A:
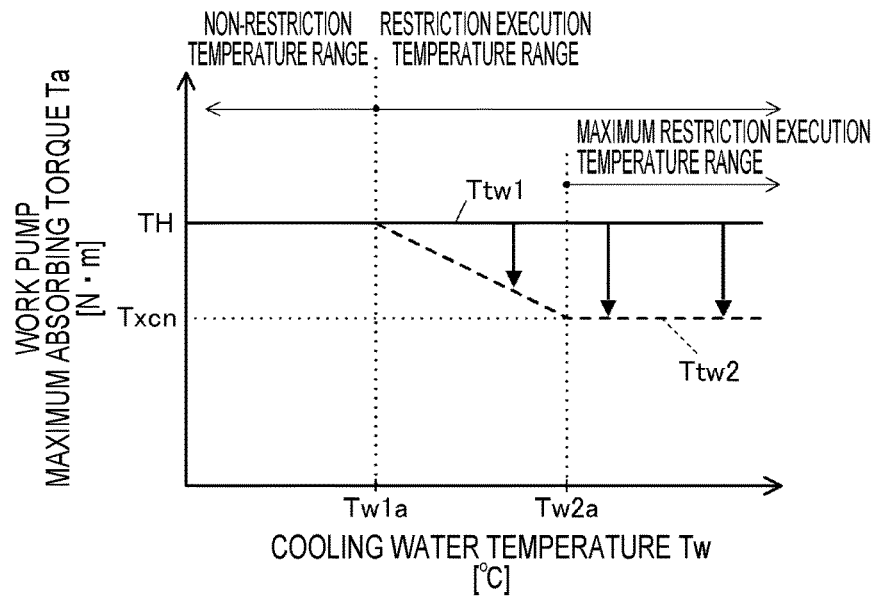
FIG. 6A is a first diagram illustrating a relation between the temperature of cooling water of the engine and the maximum absorbing torque of the work pump.

The following describes a second embodiment of the present invention with reference to FIGS. 6A and 7 to 9. Any part identical or equivalent to that in the first embodiment is denoted by an identical reference sign, and any difference from the first embodiment will be mainly described. In the first embodiment, the maximum absorbing torque Ta of the work pump 7 is restricted by using the table Tx of the maximum absorbing torque Ta of the work pump 7 associated with the substrate temperature Tt. However, in the second embodiment, the maximum absorbing torque Ta of the work pump 7 is restricted by using a table Ttw2 of the maximum absorbing torque Ta of the work pump 7 associated with a cooling water temperature Tw as illustrated in FIG. 6A.

Figure 9:
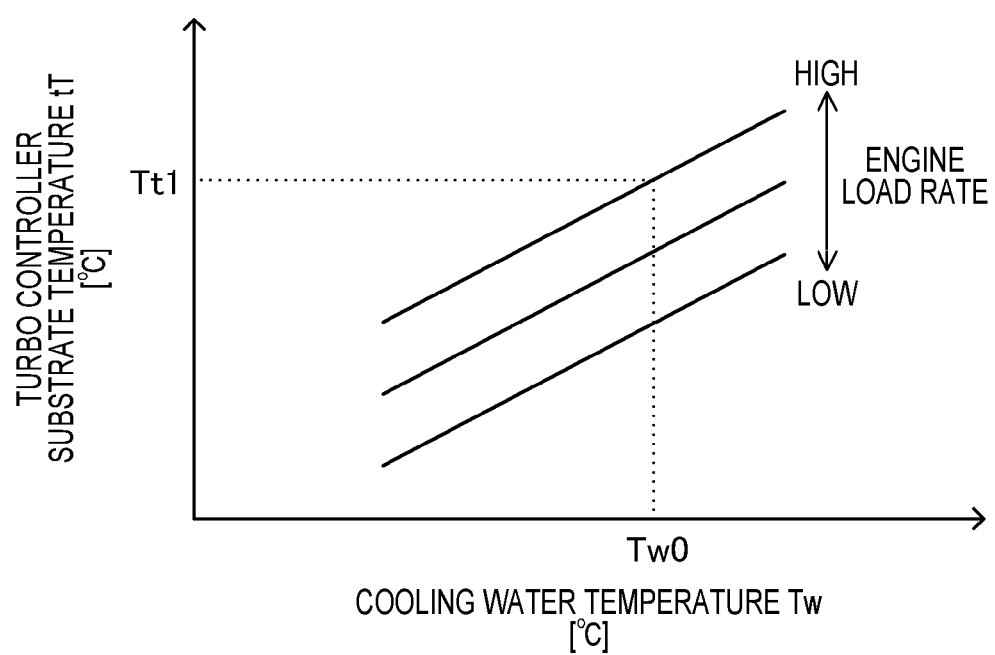
FIG. 9 is a diagram illustrating a relation among the temperature of the cooling water of the engine, the temperature of a control substrate included in the turbo controller, and a load factor of the engine.

There is a correlation between the substrate temperature Tt and the cooling water temperature Tw. For example, as illustrated in FIG. 9, the substrate temperature Tt is proportional to the cooling water temperature Tw. The substrate temperature Tt is also proportional to a load factor of the engine 190. Thus, it is effective to reduce the cooling water temperature Tw and the load factor of the engine 190 to reduce the substrate temperature Tt. In the second embodiment, the maximum absorbing torque Ta of the work pump 7 is restricted based on the cooling water temperature Tw.

FIG. 6A is a diagram illustrating a relation between the cooling water temperature Tw and the maximum absorbing torque Ta of the work pump 7. The storage device of the main controller 120 stores a table Ttw1 and the table Ttw2 indicating a characteristic of the maximum absorbing torque Ta of the work pump 7 for the cooling water temperature Tw illustrated in FIG. 6A. The maximum absorbing torque setting section 121 (refer to FIG. 4B) determines whether the substrate temperature Tt of the control substrate included in the turbo controller 140 is higher than the first restriction threshold Tt1$a$.

In case it is determined that the substrate temperature Tt is equal to or lower than the first restriction threshold Tt1$a$, the maximum absorbing torque setting section 121 selects the non-restriction table Ttw1 as a torque calculation table. In case it is determined the substrate temperature Tt is higher than the first restriction threshold Tt1$a$, the maximum absorbing torque setting section 121 selects the restriction table Ttw2 as a torque calculation table.

The maximum absorbing torque setting section 121 sets, by referring to the selected calculation table (Ttw1 or Ttw2), the maximum absorbing torque Ta of the work pump 7 based on the cooling water temperature Tw detected by the cooling water temperature sensor 162.

In case the table Ttw1 is selected, the maximum absorbing torque Ta is set to be the upper limit value TH irrespective of the cooling water temperature Tw. In other words, the maximum absorbing torque Ta is not restricted.

In case the table Ttw2 is selected, the maximum absorbing torque Ta is set in accordance with the cooling water temperature Tw as described below. In case the cooling water temperature Tw is equal to or lower than a first restriction temperature Tw1$a$, the maximum absorbing torque Ta is set to be the upper limit value TH. In case the cooling water temperature Tw is higher than the first restriction temperature Tw1$a$, the maximum absorbing torque Ta is lower than the upper limit value TH. In this manner, the maximum absorbing torque Ta of the work pump 7 is restricted in case the substrate temperature Tt is higher than the first restriction threshold Tt1$a$, and the cooling water temperature Tw is higher than the first restriction temperature Tw1$a$. In case the cooling water temperature Tw is higher than the first restriction temperature Tw1$a$, the maximum absorbing torque Ta gradually decreases as the cooling water temperature Tw increases. In case the cooling water temperature Tw is higher than a second restriction temperature Tw2$a$, the maximum absorbing torque Ta of the work pump 7 is equal to the lower limit value Txcn. In this manner, the restriction amount ΔT (=TH−Txcn) of the maximum absorbing torque Ta of the work pump 7 changes between the upper limit value TH and the lower limit value Txcn.

The first restriction temperature Tw1$a$ is a cooling water temperature corresponding to the upper limit value of the non-restriction temperature range, in other words, the lower limit value of the restriction execution temperature range, and is, for example, 90° C. approximately. The second restriction temperature Tw2a is a cooling water temperature corresponding to the lower limit value of the maximum restriction execution temperature range, and is, for example, 100° C. approximately, which is higher than the first restriction temperature Tw1a.

Figure 7:
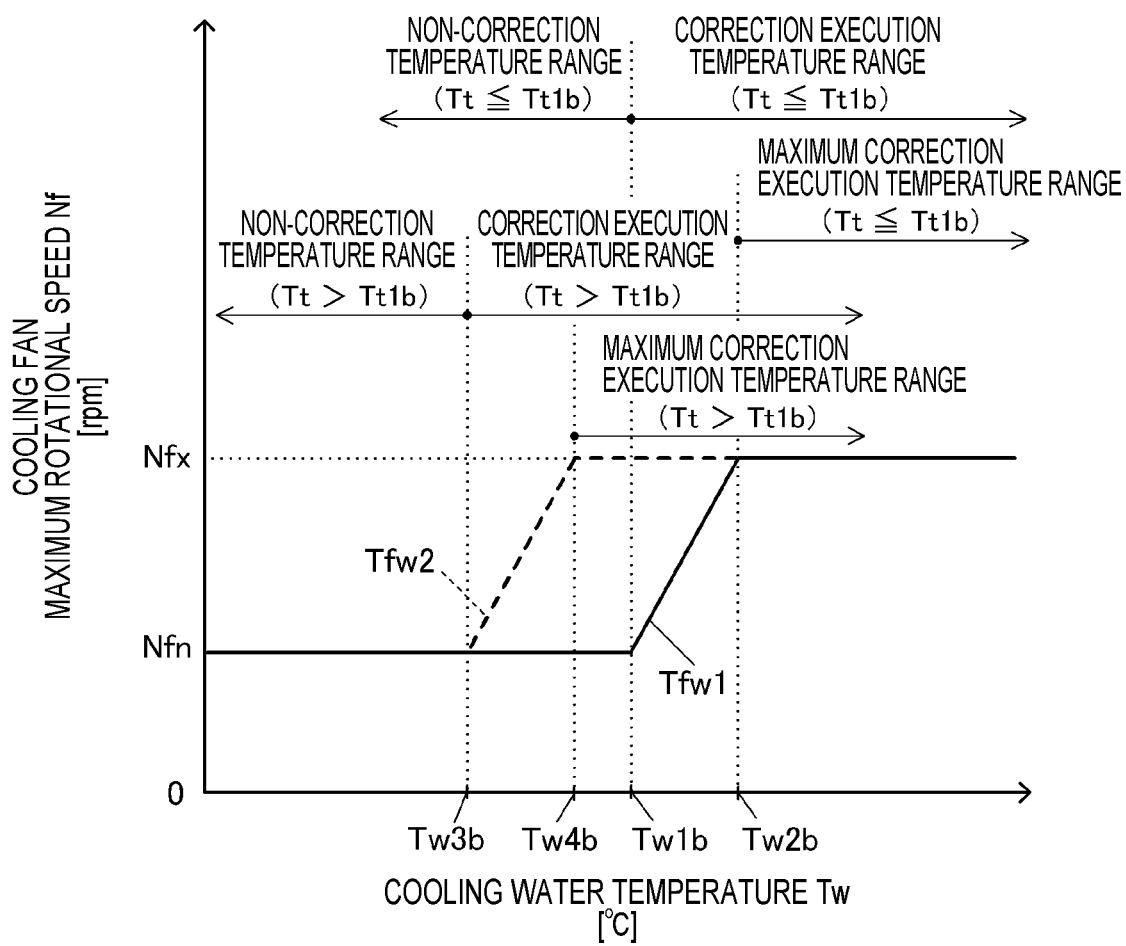
FIG. 7 is a diagram illustrating a relation between the temperature of the cooling water of the engine and a highest rotational speed of the cooling fan.

FIG. 7 is a diagram illustrating a relation between the cooling water temperature Tw and the highest rotational speed Nf of the cooling fan 13. The storage device of the main controller 120 stores a table Tfw1 and a table Tfw2 indicating a characteristic of the highest rotational speed Nf of the cooling fan 13 for the cooling water temperature Tw illustrated in FIG. 7. The fan speed setting section 122 (refer to FIG. 4B) determines whether the substrate temperature Tt of the control substrate included in the turbo controller 140 is higher than the first correction threshold Tt1b.

In case it is determined that the substrate temperature Tt is equal to or lower than the first correction threshold Tt1b, the fan speed setting section 122 selects the non-correction table Tfw1 as a speed calculation table. In case it is determined the substrate temperature Tt is higher than the first correction threshold Tt1b, the fan speed setting section 122 selects the correction table Tfw2 as a speed calculation table.

The fan speed setting section 122 sets, by referring to the selected calculation table (Tfw1 or Tfw2), the highest rotational speed Nf of the cooling fan 13 based on the cooling water temperature Tw detected by the cooling water temperature sensor 162.

In case the table Tfw1 is selected, the highest rotational speed Nf is set in accordance with the cooling water temperature Tw as described below. In case the cooling water temperature Tw is equal to or lower than a first correction temperature Tw1b, the highest rotational speed Nf is set to be the lower limit value Nfn. In case the cooling water temperature Tw is higher than the first correction temperature Tw1b, the highest rotational speed Nf is higher than the lower limit value Nfn. In this manner, speed increase correction is performed on the highest rotational speed Nf of the cooling fan 13 in case the substrate temperature Tt is equal to or lower than the first correction threshold Tt1b but the cooling water temperature Tw is higher than the first correction temperature Tw1b. In case the cooling water temperature Tw is higher than the first correction temperature Tw1b, the highest rotational speed Nf gradually increases as the cooling water temperature Tw increases. In case the cooling water temperature Tw is higher than a second correction temperature Tw2b, the highest rotational speed Nf of the cooling fan 13 is equal to the upper limit value Nfx. In this manner, the correction amount ΔN (=Nfx−Nfn) of the highest rotational speed Nf of the cooling fan 13 changes between the lower limit value Nfn and the upper limit value Nfx.

Figure 6B:
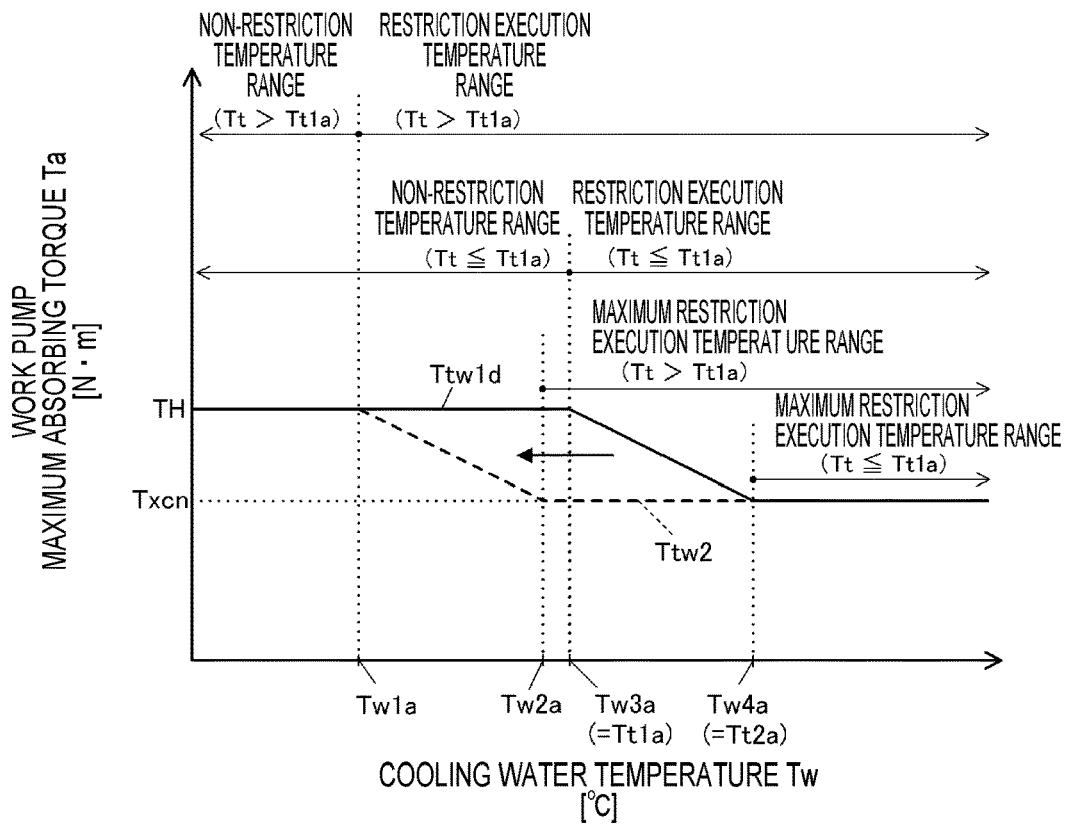
FIG. 6B is a second diagram illustrating the relation between the temperature of the cooling water of the engine and the maximum absorbing torque of the work pump.

The table Tfw2 has characteristics of the table Tfw1 described above shifted to the low temperature side of cooling water (the left side in FIG. 6B). In case the table Tfw2 is selected, the highest rotational speed Nf is set in accordance with the cooling water temperature Tw as described below. In case the cooling water temperature Tw is equal to or lower than a third correction temperature Tw3b, the highest rotational speed Nf is set to be the lower limit value Nfn. In case the cooling water temperature Tw is higher than the third correction temperature Tw3b, the highest rotational speed Nf is higher than the lower limit value Nfn. In this manner, speed increase correction is performed on the highest rotational speed Nf of the cooling fan 13 in case the substrate temperature Tt is higher than the first correction threshold Tt1b and the cooling water temperature Tw is higher than the third correction temperature Tw3b. In case the cooling water temperature Tw is higher than the third correction temperature Tw3b, the highest rotational speed Nf gradually increases as the cooling water temperature Tw increases. In case the cooling water temperature Tw is higher than a fourth correction temperature Tw4b, the highest rotational speed Nf of the cooling fan 13 is equal to the upper limit value Nfx. In this manner, the correction amount ΔN (=Nfx−Nfn) of the highest rotational speed Nf of the cooling fan 13 changes between the lower limit value Nfn and the upper limit value Nfx.

The first correction temperature Tw1b illustrated in FIG. 7 is equal to the first restriction temperature Tw1a illustrated in FIG. 6A (Tw1b=Tw1a), and is a cooling water temperature corresponding to the upper limit value of the non-correction temperature range, in other words, the lower limit value of the correction execution temperature range. The second correction temperature Tw2b illustrated in FIG. 7 is equal to the second restriction temperature Tw2a illustrated in FIG. 6A (Tw2b=Tw2a), and is a cooling water temperature corresponding to the lower limit value of the maximum correction execution temperature range. The fourth correction temperature Tw4b is lower than the first correction temperature Tw1b, and the third correction temperature Tw3b is lower than the fourth correction temperature Tw4b (Tw3b<Tw4b<Tw1b<Tw2b).

Figure 8:
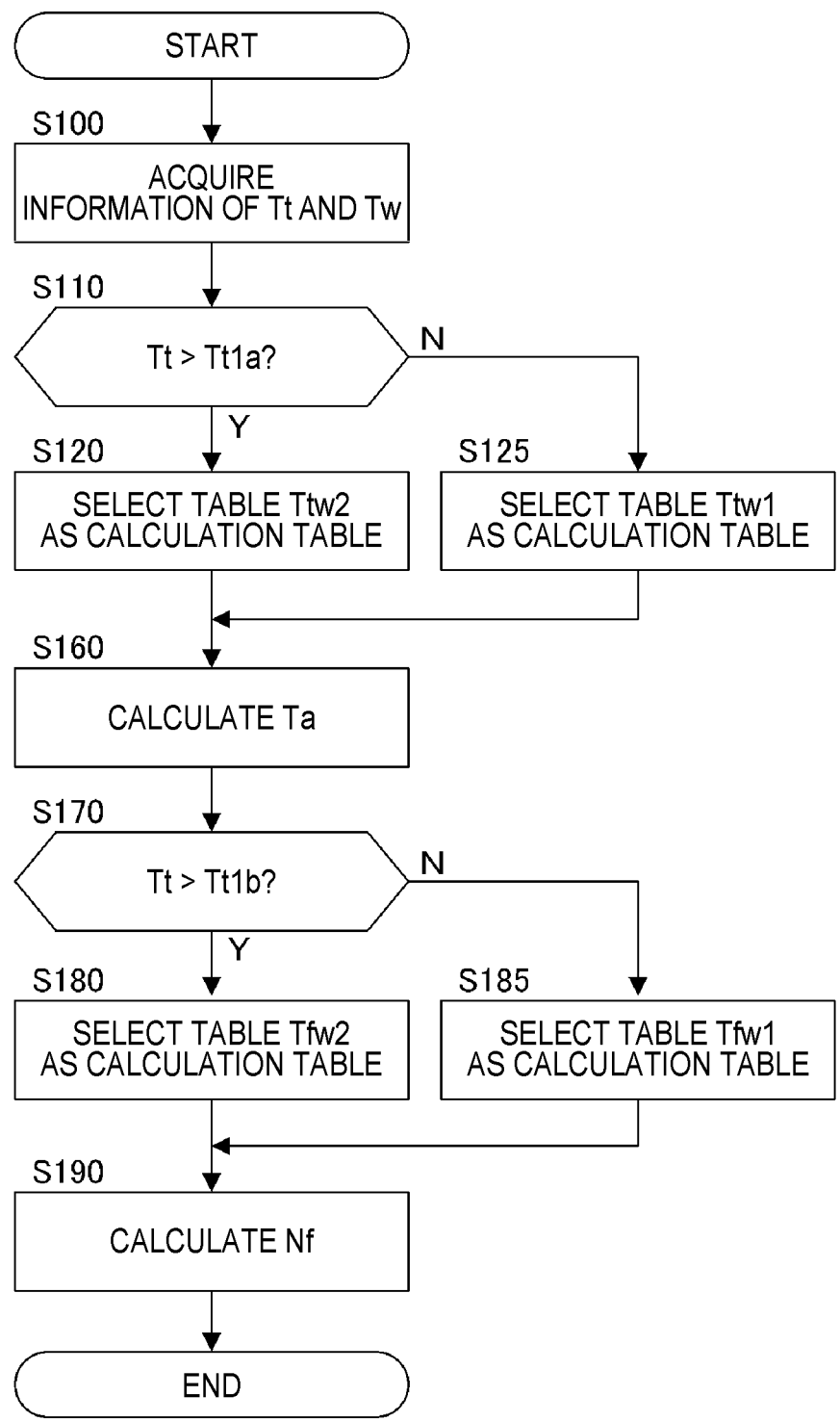
FIG. 8 is a flowchart illustrating the operation of processing of restriction control of the maximum absorbing torque of the work pump and speed increase correction control of the highest rotational speed of the cooling fan that are performed by the main controller of the wheel loader according to a second embodiment of the present invention.

The following describes the contents of the restriction control of the maximum absorbing torque Ta of the work pump 7 and the speed increase correction control of the highest rotational speed Nf of the cooling fan 13 with reference to a flowchart illustrated in FIG. 8. FIG. 8 is a flowchart illustrating the operation of processing of the restriction control of the maximum absorbing torque Ta of the work pump 7 and the speed increase correction control of the highest rotational speed Nf of the cooling fan 13 that are performed by the main controller 120 of the wheel loader 100 according to the second embodiment of the present invention. In case the ignition switch (not illustrated) is turned on, initial setting (not illustrated) is performed, and then a computer program configured to perform the processing illustrated in FIG. 8 is activated and repeatedly executed in a predetermined control period by the main controller 120.

At step S100, the main controller 120 reads and stores, into the storage device, information of the substrate temperature Tt of the control substrate included in the turbo controller 140, which is detected by the substrate temperature sensor 161, and information of the cooling water temperature Tw detected by the cooling water temperature sensor 162, and then proceeds to step S110.

At step S110, the main controller 120 determines whether the substrate temperature Tt is higher than the first restriction threshold Tt1a. The main controller 120 proceeds to step S120 if the determination at step S110 is positive, or proceeds to step S125 if the determination at step S110 is negative.

At step S120, the main controller 120 selects the table Ttw2 as a torque calculation table, and then proceeds to step S160. At step S125, the main controller 120 selects the table Ttw1 as a torque calculation table, and then proceeds to step S160.

At step S160, the main controller 120 calculates the maximum absorbing torque Ta of the work pump 7 based on the cooling water temperature Tw by referring to the torque calculation table selected at step S120 or step S125, and then proceeds to step S170.

At step S170, the main controller 120 determines whether the substrate temperature Tt is higher than the first correction threshold Tt1b. The main controller 120 proceeds to step S180 if the determination at step S170 is positive, or proceeds to step S185 if the determination at step S170 is negative.

At step S180, the main controller 120 selects the table Tfw2 as a speed calculation table, and then proceeds to step S190. At step S185, the main controller 120 selects the table Tfw1 as a speed calculation table, and then proceeds to step S190.

At step S190, the main controller 120 calculates the highest rotational speed Nf of the cooling fan 13 based on the cooling water temperature Tw by referring to the speed calculation table selected at step S180 or step S185, which ends the processing illustrated in the flowchart illustrated in FIG. 8.

In this manner, in the second embodiment, the main controller 120 restricts the maximum absorbing torque Ta of the work pump 7 to be low based on the cooling water temperature Tw in case the substrate temperature Tt of the control substrate included in the turbo controller 140 is higher than the first restriction threshold Tt1a.

According to the second embodiment as described above, effects described below are achieved in addition to effects same as those of the first embodiment.

(7) Since the characteristics of the table Ttw2 are set in advance with taken into consideration the correlation between the substrate temperature Tt and the cooling water temperature Tw, the main controller 120 can effectively reduce the temperature of the turbo controller 140 even if the substrate temperature Tt of the control substrate included in the turbo controller 140 cannot be detected in real time.

In case the cooling water temperature is maintained at a constant water temperature (for example, Tw0), as illustrated in FIG. 9, the substrate temperature Tt of the turbo controller 140 decreases due to surrounding environment and the operation situation of the engine 190 as the engine load factor decreases. According to the present embodiment, since the maximum absorbing torque Ta of the work pump 7 is restricted to a low torque as described above, the operation speed of the front working device 102 decreases, the work cycle time increases, and the load of the engine 190 decreases. Accordingly, the temperature of the turbo controller 140 can be decreased even if the cooling water temperature is maintained at a constant temperature. Since the cooling water temperature Tw is proportional to the load factor of the engine 190, typically, the cooling water temperature Tw can be decreased by reducing the load factor of the engine 190, thereby further effectively decreasing the temperature of the turbo controller 140.

(8) In the present embodiment, the speed increase correction control of the cooling fan 13 is executed in addition to the restriction control of the maximum absorbing torque Ta of the work pump 7. In case the substrate temperature Tt of the control substrate included in the turbo controller 140 is higher than the first correction threshold Tt1b, the main controller 120 executes correction to increase the highest rotational speed Nf of the cooling fan 13 based on the cooling water temperature Tw. Accordingly, the temperature of the cooling water can be effectively decreased as compared to case the speed increase correction of the cooling fan 13 is not executed, thereby effectively decreasing the temperature of the turbo controller 140.

Modification 1 of Second Embodiment

The second embodiment describes the example in which the non-restriction table Ttw1 has such a characteristic (refer to FIG. 6A) that the maximum absorbing torque Ta of the work pump 7 is set to be the upper limit value TH irrespective of the cooling water temperature Tw. However, the present invention is not limited thereto. The non-restriction table may have a characteristic that changes in accordance with the cooling water temperature Tw.

FIG. 6B is a diagram illustrating a table according to Modification 1 of the second embodiment, and similarly to FIG. 6A, illustrates the relation between the cooling water temperature Tw and the maximum absorbing torque Ta of the work pump 7. In the present modification, a table Ttw1d is stored as a non-restriction table in the storage device in place of the table Ttw1 illustrated in FIG. 6A. In case the table Ttw1d is selected as a torque calculation table by the maximum absorbing torque setting section 121, the maximum absorbing torque Ta is set in accordance with the cooling water temperature Tw as described below.

In case the cooling water temperature Tw is equal to or lower than a third restriction temperature Tw3a, the maximum absorbing torque Ta is set to be the upper limit value TH. In case the cooling water temperature Tw is higher than the third restriction temperature Tw3a, the maximum absorbing torque Ta is lower than the upper limit value TH. In this manner, in the present modification, the maximum absorbing torque Ta of the work pump 7 is restricted in case the substrate temperature Tt does not exceed the first restriction threshold Tt1a but the cooling water temperature Tw is higher than the third restriction temperature Tw3a. In case the cooling water temperature Tw is higher than the third restriction temperature Tw3a, the maximum absorbing torque Ta gradually decreases as the cooling water temperature Tw increases. In case the cooling water temperature Tw is higher than a fourth restriction temperature Tw4a, the maximum absorbing torque Ta of the work pump 7 is equal to the lower limit value Txcn.

The third restriction temperature Tw3a is higher than the first restriction temperature Tw1a and substantially equal to, for example, the first restriction threshold Tt1a described in the first embodiment. The third restriction temperature Tw3a is a cooling water temperature corresponding to the upper limit value of the non-restriction temperature range, in other words, the lower limit value of the restriction execution temperature range in case the substrate temperature Tt is equal to or lower than the first restriction threshold Tt1a. The fourth restriction temperature Tw4a is higher than the second restriction temperature Tw2a and substantially equal to, for example, the second restriction threshold Tt2a described in the first embodiment. The fourth restriction temperature Tw4a is a cooling water temperature corresponding to the lower limit value of the maximum restriction execution temperature range in case the substrate temperature Tt is equal to or lower than the first restriction threshold Tt1a.

According to Modification 1 of the second embodiment as described above, effects described below are achieved in addition to effects same as those of the second embodiment.

(9) In case the substrate temperature Tt of the control substrate included in the turbo controller 140 is lower than the first restriction threshold Tt1a but the cooling water temperature Tw is higher than the third restriction temperature Tw3a, the main controller 120 restricts the maximum absorbing torque Ta of the work pump 7 to be low as compared to case the cooling water temperature Tw is lower than the third restriction temperature Tw3a. In case the substrate temperature Tt is lower than the first restriction threshold Tt1a but the cooling water temperature Tw is high, the temperature of the turbo controller 140 potentially becomes high in a short time once work is performed. According to the present modification, increase of the temperature of the turbo controller 140 can be reduced by restricting the engine 190 based on the cooling water temperature Tw in case the substrate temperature Tt is lower than the first restriction threshold Tt1a.

(10) In addition, increase of the temperature of the turbo controller 140 can be reduced as backup in case failure occurs to the substrate temperature sensor 161 or a signal line connecting the substrate temperature sensor 161 and the main controller 120.

Modification 2 of Second Embodiment

The second embodiment describes the example in which a detection signal corresponding to the substrate temperature Tt detected by the substrate temperature sensor 161 is directly input to the main controller 120. However, the present invention is not limited thereto. For example, the detection signal corresponding to the substrate temperature Tt detected by the substrate temperature sensor 161 may be input to the engine controller 130 so that the substrate temperature Tt is monitored in real time by the engine controller 130. In the present modification, the main controller 120 and the substrate temperature sensor 161 are not directly connected with each other.

The engine controller 130 determines whether the substrate temperature Tt of the control substrate included in the turbo controller 140 is higher than the first restriction threshold Tt1a. In case the substrate temperature Tt being equal to or lower than the first restriction threshold Tt1a becomes higher than the first restriction threshold Tt1a, the engine controller 130 starts time measurement with a built-in timer.

The engine controller 130 determines whether the substrate temperature Tt is continuously equal to or larger than the first restriction threshold Tt1a for a time threshold t0 or longer. In case a time (measured time t) measured by the built-in timer is equal to or longer than the time threshold t0, the engine controller 130 determines that a restriction execution condition is satisfied, and sets a restriction execution mode. In case the restriction execution mode is set, a restriction execution signal is output from the engine controller 130 to the main controller 120. The time threshold t0 is set to be, for example, 30 minutes approximately and stored in the storage device of the engine controller 130 in advance.

In case the substrate temperature Tt of the control substrate included in the turbo controller 140 becomes equal to or lower than the first restriction threshold Tt1a while the restriction execution mode is set, the engine controller 130 determines that a restriction cancellation condition is satisfied, and sets a non-restriction mode. In case the non-restriction mode is set, the outputting of the restriction execution signal from the engine controller 130 to the main controller 120 is stopped, or a restriction cancellation signal is output in place of the restriction execution signal.

The maximum absorbing torque setting section 121 (refer to FIG. 4B) and the fan speed setting section 122 (refer to FIG. 4B) of the main controller 120 determine whether the restriction execution signal is input from the engine controller 130.

In case it is determined that the restriction execution signal is not input, the maximum absorbing torque setting section 121 selects the non-restriction table Ttw1 (refer to FIG. 6A) as a torque calculation table. In case it is determined that the restriction execution signal is input, the maximum absorbing torque setting section 121 selects the restriction table Ttw2 (refer to FIG. 6A) as a torque calculation table.

In case it is determined that the restriction execution signal is not input, the fan speed setting section 122 selects the table Tfw1 (refer to FIG. 7) as a speed calculation table. In case it is determined that the restriction execution signal is input, the fan speed setting section 122 selects the table Tfw2 (refer to FIG. 7) as a speed calculation table.

Figure 10:
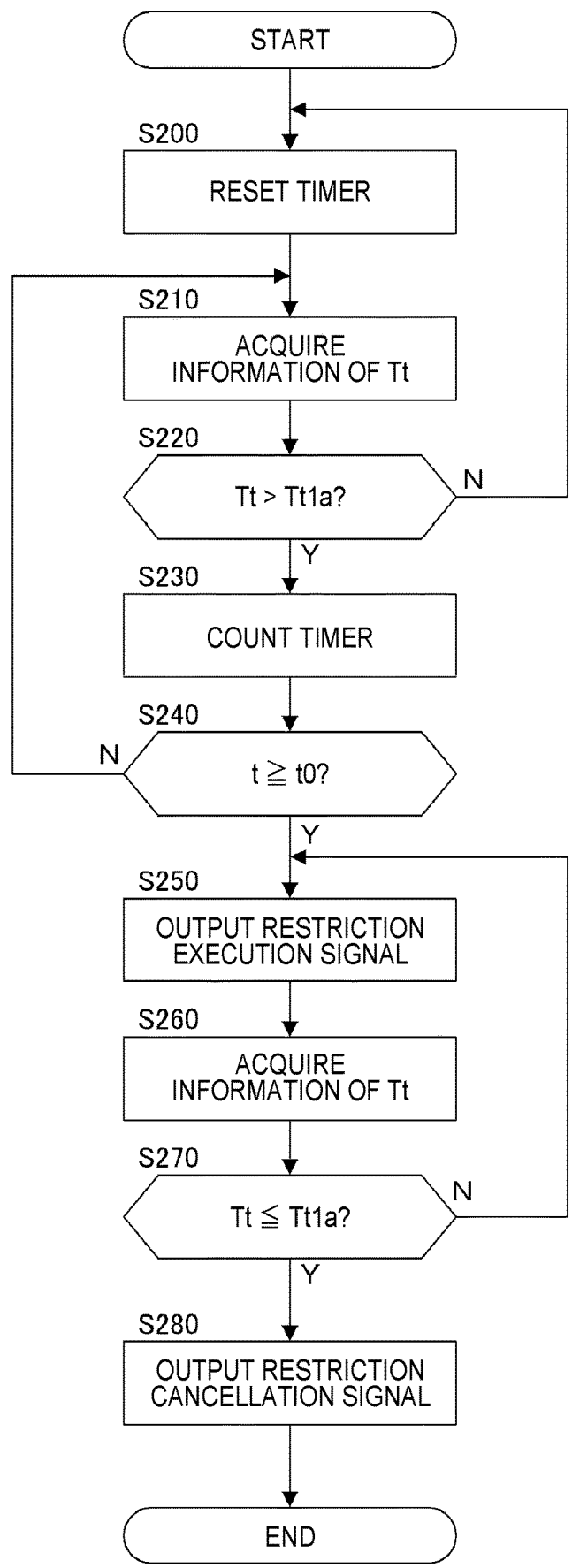
FIG. 10 is a flowchart illustrating the operation of restriction execution determination control processing by an engine controller of the wheel loader according to Modification 2 of the second embodiment.

FIG. 10 is a flowchart illustrating operation of restriction execution determination control processing performed by the engine controller 130 of the wheel loader 100 according to Modification 2 of the second embodiment. In case the ignition switch (not illustrated) is turned on, initial setting (not illustrated) is performed, and then a computer program configured to perform the processing illustrated in FIG. 10 is activated and repeatedly executed in a predetermined control period by the engine controller 130. In the initial setting, the non-restriction mode, in which the restriction cancellation signal is to be output (or the restriction execution signal is not to be output), is set.

In timer reset processing at step S200, the engine controller 130 sets the measured time t by the built-in timer (not illustrated) to be zero, and then proceeds to step S210.

At step S210, the engine controller 130 reads and stores, into the storage device, the information of the substrate temperature Tt of the control substrate included in the turbo controller 140, which is detected by the substrate temperature sensor 161, and then proceeds to step S220.

At step S220, the engine controller 130 determines whether the substrate temperature Tt is higher than the first restriction threshold Tt1a. The main controller 120 proceeds to step S230 if the determination at step S220 is positive, or returns to step S200 if the determination at step S220 is negative.

In timer count processing at step S230, the engine controller 130 performs time measurement with the built-in timer (not illustrated) (the measured time t←t+Δt), and then proceeds to step S240.

At step S240, the engine controller 130 determines whether the measured time t is equal to or larger than the time threshold t0. If the determination at step S240 is positive, the engine controller 130 determines that the restriction execution condition is satisfied, and then proceeds to step S250. If the determination at step S240 is negative, the engine controller 130 determines that the restriction execution condition is not satisfied, and then returns to step S210.

At step S250, the engine controller 130 sets a restriction mode, outputs the restriction execution signal commanding restriction execution of the maximum absorbing torque Ta of the work pump 7 to the main controller 120, and then proceeds to step S260.

At step S260, the engine controller 130 reads and stores, into the storage device, the information of the substrate temperature Tt of the control substrate included in the turbo controller 140, which is detected by the substrate temperature sensor 161, and then proceeds to step S270.

At step S270, the engine controller 130 determines whether the substrate temperature Tt is equal to or lower than the first restriction threshold Tt1a. If the determination at step S270 is negative, the engine controller 130 determines that the restriction cancellation condition is not satisfied, and then returns to step S250. If the determination at step S270 is positive, the engine controller 130 determines that the restriction cancellation condition is satisfied, and then proceeds to step S280.

At step S280, the engine controller 130 sets the non-restriction mode and outputs the restriction cancellation signal for canceling the restriction of the maximum absorbing torque Ta of the work pump 7 to the main controller 120, which ends the processing illustrated in the flowchart illustrated in FIG. 13.

Figure 11:
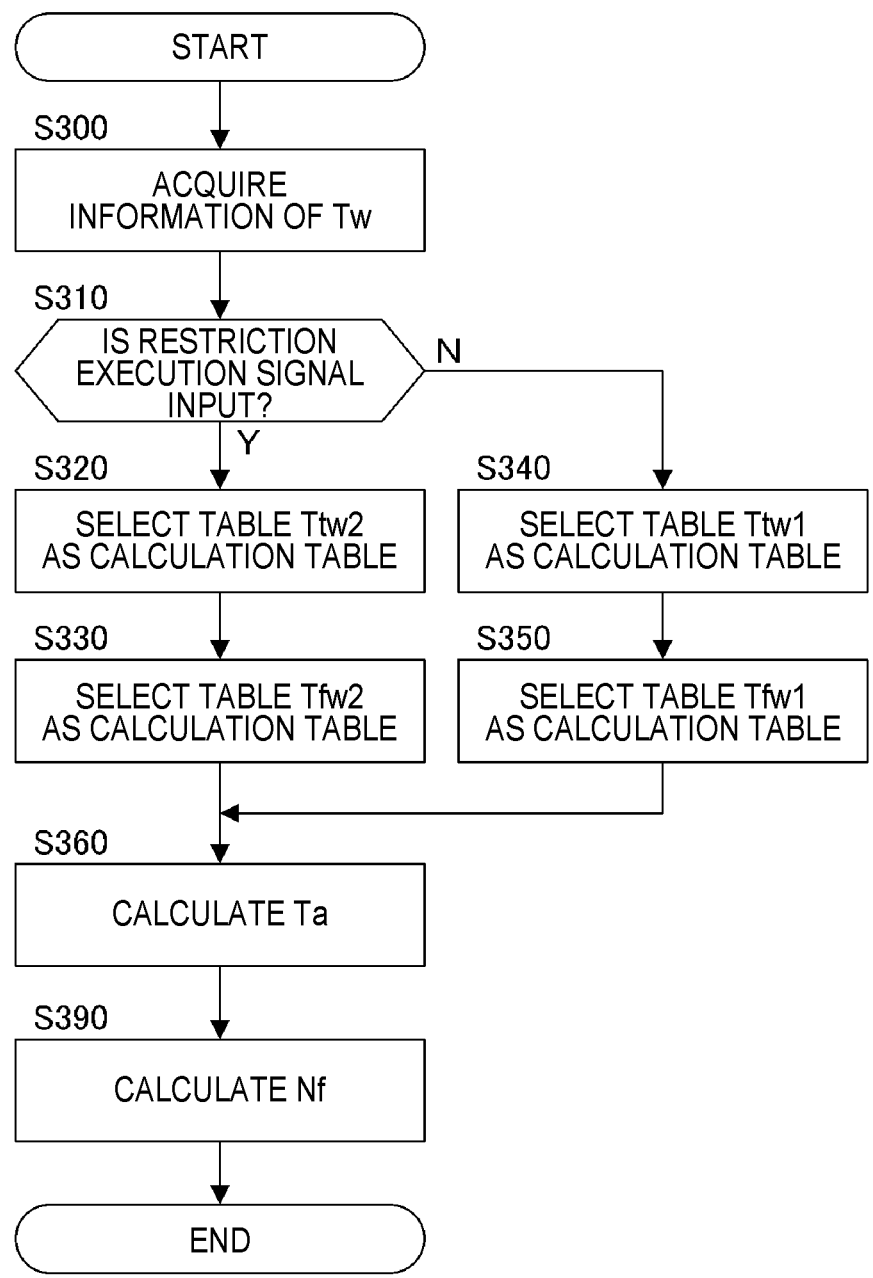
FIG. 11 is a flowchart illustrating the operation of processing of restriction control of the maximum absorbing torque of the work pump and the speed increase correction control of the highest rotational speed of the cooling fan that are performed by the main controller of the wheel loader according to Modification 2 of the second embodiment.

FIG. 11 is a flowchart illustrating the operation of processing of the restriction control of the maximum absorbing torque Ta of the work pump 7 and the speed increase correction control of the highest rotational speed Nf of the cooling fan 13 that are performed by the main controller 120 of the wheel loader 100 according to Modification 2 of the second embodiment. In case the ignition switch (not illustrated) is turned on, initial setting (not illustrated) is performed, and then a computer program configured to perform the processing illustrated in FIG. 11 is activated and repeatedly executed in a predetermined control period by the main controller 120.

As illustrated in FIG. 11, at step S300, the main controller 120 reads and stores, into the storage device, the information of the cooling water temperature Tw detected by the cooling water temperature sensor 162, and then proceeds to step S310.

At step S310, the main controller 120 determines whether the restriction execution signal is input. If the determination at step S310 is positive, in other words, if the restriction mode is set by the engine controller 130 and the restriction execution signal is output from the engine controller 130 to the main controller 120, the main controller 120 proceeds to step S320. If the determination at step S310 is negative, in other words, if the non-restriction mode is set by the engine controller 130, and the restriction execution signal is not output from the engine controller 130 to the main controller 120 or the restriction cancellation signal is output, the main controller 120 proceeds to step S340.

At step S320, the main controller 120 selects the table Ttw2 as a torque calculation table, and then proceeds to step S330. At step S340, the main controller 120 selects the table Ttw1 as a torque calculation table, and then proceeds to step S350.

At step S330, the main controller 120 selects the table Tfw2 as a speed calculation table, and then proceeds to step S360. At step S350, the main controller 120 selects the table Tfw1 as a speed calculation table, and then proceeds to step S360.

At step S360, the main controller 120 calculates the maximum absorbing torque Ta of the work pump 7 based on the cooling water temperature Tw by referring to the torque calculation table selected at step S320 or step S340, and then proceeds to step S390.

At step S390, the main controller 120 calculates the highest rotational speed Nf of the cooling fan 13 based on the cooling water temperature Tw by referring to the speed calculation table selected at step S330 or step S350, which ends the processing illustrated in the flowchart in FIG. 11.

According to the modification as described above, similarly to the second embodiment, the main controller 120 can effectively reduce the temperature of the turbo controller 140 even if the substrate temperature Tt of the control substrate included in the turbo controller 140 cannot be detected in real time.

Modifications described below are included in the scope of the present invention, and one or a plurality of the modifications may be combined with each above-described embodiment.

Modification 1

Each above-described embodiment describes the example in which, after having restricted the maximum absorbing torque Ta of the work pump 7, the main controller 120 cancels the restriction in case the substrate temperature Tt of the control substrate included in the turbo controller 140 becomes equal to or lower than the first restriction threshold Tt1a. However, the present invention is not limited thereto. The restriction may be canceled in case the cooling water temperature Tw of the engine 190 becomes equal to or lower than a predetermined temperature equal to lower than the first restriction temperature Tw1a.

Modification 2

Each above-described embodiment describes the example in which, after having corrected the highest rotational speed Nf of the cooling fan 13, the main controller 120 cancels the correction in case the substrate temperature Tt of the control substrate included in the turbo controller 140 becomes equal to or lower than the first correction threshold Tt1b. However, the present invention is not limited thereto. The restriction may be canceled in case the cooling water temperature Tw of the engine 190 becomes equal to or lower than a predetermined temperature equal to or lower than the first correction temperature Tw1b.

Modification 3

Each above-described embodiment describes the example in which the supercharger 50 configured to control supercharge pressure includes the nozzle vane mechanism 59 having a changeable opening area on the discharge side. However, the present invention is not limited thereto. An opening area adjustment mechanism having a changeable opening area may be provided on the intake side and controlled by the turbo controller 140 to adjust the flow rate of intake air, thereby changing the supercharge pressure. The opening area adjustment mechanism having a changeable opening area may be provided on each of the discharge side and the intake side. The opening area adjustment mechanism is not limited to the nozzle vane mechanism 59. For example, the flow rate may be controlled by opening and closing a flow rate control valve.

Modification 4

The above-described embodiment describing the example in which the substrate temperature Tt detected by the substrate temperature sensor 161 mounted on the control substrate of the turbo controller 140 is employed as the temperature of the turbo controller 140 used for the restriction control of the maximum absorbing torque Ta of the work pump 7 and the correction control of the highest rotational speed Nf of the cooling fan 13. However, the present invention is not limited thereto. For example, the temperature of the casing of the control substrate included in the turbo controller 140 may be employed as the temperature of the turbo controller 140.

Modification 5

Each above-described embodiment describes the example in which the turbo controller 140 is cooled by the cooling water of the engine 190. However, the present invention is not limited thereto. A cooling fan (not illustrated) configured to cool the turbo controller 140 may be provided.

Modification 6

Each above-described embodiment describes the example in which the maximum absorbing torque Ta of the work pump 7 is set by referring to the tables Tx, Ttw1, and Ttw2, and the highest rotational speed Nf of the cooling fan 13 is set by referring to the tables Tf, Tfw1, and Tfw2. However, the present invention is not limited thereto. The same characteristics may be stored in a function format instead of a table format.

Modification 7

Each above-described embodiment describes the example in which the rotational speed of the cooling fan 13 is controlled by setting the set pressure (relief pressure) of the variable relief valve 9 in accordance with the control current from the main controller 120. However, the present invention is not limited thereto. For example, a variable displacement hydraulic motor may be employed as the fan motor 11 so that the rotational speed of the cooling fan 13 is controlled by outputting a control signal from the main controller 120 to a motor regulator (tilt control device of the fan motor 11). Alternatively, an electromagnetic switching valve may be connected with the discharge side pipe line of the fan pump 8 so that the rotational speed of the cooling fan 13 is controlled by adjusting a switching amount of the electromagnetic switching valve in accordance with a control signal from the main controller 120. A variable displacement hydraulic pump may be employed as the fan pump 8 so that the rotational speed of the cooling fan 13 is controlled by outputting a control signal from the main controller 120 to a pump regulator (tilt control device of the fan pump 8).

Modification 8

Each above-described embodiment describes the example in which the present invention is applied to a wheel loader. However, the present invention is applicable to another work machine such as a crawler-type hydraulic pressure shovel, a wheel shovel, or a forklift.

Although various kinds of embodiments and modifications are described above, the present invention is not limited to these contents. Any other possible aspect in the scope of the technical idea of the present invention is included in the scope of the present invention.

REFERENCE SIGNS LIST

7 work pump (work hydraulic pump), 8 fan pump (fan hydraulic pump), 9 relief valve, 11 fan motor (fan hydraulic motor), 13 cooling fan, 14 radiator (heat exchanger), 50 supercharger, 100 wheel loader (work machine), 102 front working device (working device), 120 main controller (main control device, fan control device), 140 turbo controller (supercharger control device), 161 substrate temperature sensor (temperature detection device), 162 cooling water temperature sensor (refrigerant temperature detection device), 190 engine

The invention claimed is:

1. A work machine including a variable geometry supercharger having changeable supercharge pressure and a working device, the work machine comprising:
a variable displacement work hydraulic pump configured to be driven by an engine and supply pressure oil to an actuator configured to drive the working device;
a supercharger control device configured to control the supercharger;
a temperature detection device configured to detect the temperature of the supercharger control device; and
a main control device configured to restrict, when the temperature of the supercharger control device is higher than a first temperature, a maximum absorbing torque of the work hydraulic pump as compared to when the temperature of the supercharger control device is lower than the first temperature.

2. The work machine according to claim 1, further comprising a refrigerant temperature detection device configured to detect the temperature of refrigerant of the engine, wherein, the temperature of the supercharger control device is higher than the first temperature, the main control device restricts the maximum absorbing torque of the work hydraulic pump based on the temperature of the refrigerant.

3. The work machine according to claim 1, further comprising:
a heat exchanger configured to cool refrigerant of the engine; a cooling fan configured to generate cooling wind for the heat exchanger;
a fan hydraulic pump configured to be driven by the engine; a fan hydraulic motor configured to be driven by pressure oil discharged from the fan hydraulic pump and rotate the cooling fan; and
a fan control device configured to control the rotational speed of the cooling fan based on the temperature of the supercharger control device,
wherein, when the temperature of the supercharger control device is higher than a second temperature, the fan control device executes correction to increase the rotational speed of the cooling fan as compared when the temperature of the supercharger control device is lower than the second temperature.

4. The work machine according to claim 3, further comprising a refrigerant temperature detection device configured to detect the temperature of refrigerant of the engine, wherein, the temperature of the supercharger control device is higher than the second temperature, the fan control device executes correction to increase the rotational speed of the cooling fan based on the temperature of the refrigerant.

5. The work machine according to claim 1, wherein, after having restricted the maximum absorbing torque of the work hydraulic pump, the main control device cancels the restriction when the temperature of the supercharger control device becomes lower than a threshold equal to or lower than the first temperature.

6. The work machine according to claim 1, wherein, after having restricted the maximum absorbing torque of the work hydraulic pump, the main control device cancels the restriction when the temperature of refrigerant of the engine becomes lower than a first refrigerant temperature.

7. The work machine according to claim 3, wherein, after having executed correction to increase the rotational speed of the cooling fan, the fan control device cancels the correction when the temperature of the supercharger control device becomes lower than a threshold equal to or lower than the second temperature.

8. The work machine according to claim 3, wherein, after having executed correction to increase the rotational speed of the cooling fan, the fan control device cancels the correction when the temperature of the refrigerant of the engine becomes lower than a second refrigerant temperature.

* * * * *